(12) United States Patent
Kemeny

(10) Patent No.: US 11,592,054 B1
(45) Date of Patent: Feb. 28, 2023

(54) BOLTS AND BOLT AND NUT FASTENERS

(71) Applicant: Zoltan A. Kemeny, Chandler, AZ (US)

(72) Inventor: Zoltan A. Kemeny, Chandler, AZ (US)

(*) Notice: Subject to any disclaimer, the term of this patent is extended or adjusted under 35 U.S.C. 154(b) by 0 days.

(21) Appl. No.: 17/676,466

(22) Filed: Feb. 21, 2022

Related U.S. Application Data

(63) Continuation of application No. 17/408,718, filed on Aug. 23, 2021, now abandoned.

(60) Provisional application No. 63/205,671, filed on Jan. 4, 2021.

(51) Int. Cl.
| | | |
|---|---|---|
| F16B 37/00 | (2006.01) | |
| F16B 39/38 | (2006.01) | |
| F16B 31/04 | (2006.01) | |

(52) U.S. Cl.
CPC .............. F16B 39/38 (2013.01); F16B 37/00 (2013.01); F16B 31/04 (2013.01)

(58) Field of Classification Search
CPC .................................. F16B 31/04; F16B 37/00
USPC .......................................... 411/432, 917, 14.5
See application file for complete search history.

(56) References Cited

U.S. PATENT DOCUMENTS

| | | | | |
|---|---|---|---|---|
| 1,467,824 A | | 9/1923 | Ahlers | |
| 2,696,236 A | | 12/1954 | Curran | |
| 3,093,025 A | | 6/1963 | Wasserman | |
| 3,435,777 A | * | 4/1969 | Schaaf | F16B 31/04 411/432 |
| 3,901,122 A | * | 8/1975 | Novotny | F16B 37/00 411/917 |
| 4,087,896 A | * | 5/1978 | Salter | F16B 37/00 81/53.2 |
| 4,840,529 A | | 6/1989 | Phillips | |
| 5,391,033 A | | 2/1995 | Gibbons | |
| 5,536,127 A | | 7/1996 | Penning | |
| 5,582,496 A | * | 12/1996 | Ambrico | F16B 39/12 411/932 |
| 6,019,556 A | * | 2/2000 | Hess | F16B 31/04 411/149 |
| 6,125,526 A | | 10/2000 | Wierzchon | |
| 6,196,781 B1 | | 3/2001 | Yang | |
| 6,905,298 B1 | * | 6/2005 | Haring | F16B 5/025 411/432 |
| 7,213,999 B2 | | 5/2007 | Haas | |
| 7,338,240 B2 | * | 3/2008 | Hohmann | B25B 29/02 411/917 |
| 2005/0025607 A1 | * | 2/2005 | Guantonio | F16B 39/12 411/222 |
| 2012/0263558 A1 | * | 10/2012 | Swanson | F16B 37/145 411/432 |
| 2018/0087555 A1 | | 3/2018 | Owens et al. | |
| 2018/0119722 A1 | | 5/2018 | Vik | |

* cited by examiner

*Primary Examiner* — Flemming Saether
(74) *Attorney, Agent, or Firm* — Michael W. Goltry; Robert A. Parsons; Parsons & Goltry, PLLC

(57) ABSTRACT

A bolt includes a shank having a first end, a second end, a first external thread proximate to the first end, and a second external thread proximate to the second end. The first external thread twists in a first direction, the second external thread twists in a second direction, and the first direction is different from the second direction. The first external thread includes a minor diameter, the second external thread includes a major diameter, and the minor diameter of the first external thread is greater than the major diameter of the second external thread.

4 Claims, 31 Drawing Sheets

BOLTS AND BOLT AND NUT FASTENERS

CROSS-REFERENCE TO RELATED APPLICATION

This application claims the benefit of U.S. Provisional Patent Application No. 63/205,671, filed 4 Jan. 2021, incorporated herein by reference in its entirety.

FIELD OF THE INVENTION

The present invention generally relates to bolts, bolt and nut fasteners, and bolted joints.

BACKGROUND OF THE INVENTION

In many manufactured products, it is essential to join two or more elements or surfaces together. Bolted joints are useful for this when the elements require periodic disassembly and assembly without destroying the joint.

Bolted joints include fasteners that capture and join other parts, and are secured by mating screw threads. A bolted joint is either a soft joint or a hard joint. A soft-bolted joint is when the hardness of at least one of the elements is below 30 RC. A hard-bolted joint is when the hardness of all the elements is greater than 30 RC. A bolted joint may use a through-hole or a tapped hole. A through-hole or stud joint relies on parts joined together using a stud. A tapped hole or screw joint relies on parts joined together using a threaded hole and a threaded fastener.

The objective of a bolted joint is to maintain joint cohesiveness, whether a tension joint or a shear joint. The axial forces exerted by the parts of a tension joint try to separate the joint. Accordingly, the bolt of a tension joint must serve as a clamp to hold the parts together. The shear forces exerted by the elements of a shear joint try to separate the joint. Accordingly, the bolt of a shear joint must serve as a pin to keep the parts stationary.

A standard bolt is a longitudinally straight shank including a first end, a second end, a head proximate to the first end, and an external thread. The external thread between the first and second ends is configured to thread on an internal thread of a tapped nut, through-hole, or blind hole. A standard bolted joint includes the internal thread exerting an axial clamping force and the bolt's shank acting as a dowel, pinning the joint against lateral shear forces. The locking method of the bolted joint includes the internal thread of the nut, opening, or blind bore on the external thread of the bolt. Rotational engagement of the internal thread over and on the external thread creates axial clamping.

Vibration and prevailing torque capable of inducing relative movement between bolted structures can loosen bolted joints by unwinding the bolt's external thread from the applied internal thread. While skilled artisans have developed locknuts, jam nuts, lock washers, and thread-locking fluid to resist loosening, existing methods are not entirely satisfactory, unreliable, and, in many implementations, impracticable, necessitating continued improvement in the art.

SUMMARY OF THE INVENTION

According to the invention, a bolt includes a shank including a first end, a second end configured with an enlarged head for bolt-turn purposes, a first external thread proximate to the first end, and a second external thread proximate to the second end. The first external thread twists in a first direction, and the second external thread twists in a second direction different from the first direction. The first external thread includes a first pitch, the second external thread includes a second pitch, and the first pitch is different from the second pitch. A body of the shank separates the first external thread from the second external thread. The body of the shank is unthreaded. The first external thread includes a minor diameter, the second external thread includes a major diameter, and the minor diameter of the first external thread is greater than the major diameter of the second external thread. A nut includes a threaded hole including an internal thread having a minor diameter and a pitch. The pitch of the nut is equal to the first pitch, the minor diameter of the internal thread is greater than the major diameter of the second external thread, and the internal thread corresponds to and is configured to thread on the first external thread.

According to the invention, a bolt includes a shank including a first end, a second end, an enlarged head proximate to the first end, the enlarged head configured with a first external thread and a radial bearing surface between the shank and the first external thread and facing the second end, and a second external thread proximate to the second end. The first external thread twists in a first direction and includes a minor diameter, and the second external thread twists in a second direction different from the first direction and includes a major diameter less than the minor diameter. The first external thread includes a first pitch, the second external thread includes a second pitch, and the first pitch is equal to the second pitch. The enlarged head is configured with one of a socket and a key for bolt-turn purposes. A body of the shank separates the first external thread from the second external thread. The body of the shank is unthreaded. A nut includes a threaded hole including an internal thread having a minor diameter and a pitch. The pitch of the nut is equal to both the first pitch and the second pitch. The minor diameter of the internal thread greater than the major diameter of the second external thread, and the internal thread corresponds to and is configured to thread on the first external thread.

According to the invention, a bolt includes a shank including a first end, a second end, a first external thread proximate to the first end, and a second external thread proximate to the second end. The first external thread twists in a first direction and includes a first pitch and a minor diameter. The second external thread twists in a second direction different from the first direction and includes a second pitch equal to the first pitch and a major diameter less than the minor diameter. A nut includes a threaded hole including an internal thread having a minor diameter and a pitch. The pitch of the nut is equal to both the first pitch and the second pitch, the minor diameter of the internal thread is greater than the major diameter of the second external thread, and the internal thread corresponds to and is configured to thread on the first external thread. A body of the shank separates the first external thread from the second external thread. The body of the shank is unthreaded.

According to the invention, a fastener includes a bolt, an anchor nut, and a locknut. The bolt includes a shank having a first end, a second end, and a first external thread proximate to the first end and including a major diameter. The anchor nut includes a head, a second external thread including a minor diameter greater than the major diameter, and a first hole including a first internal thread configured to thread on the first external thread. The locknut includes a second hole including a second internal thread configured to thread on the second external thread. The first external thread and the first internal thread twist in a first direction, and the second external thread and the second internal thread twist in a second direction different from the first direction. The first external thread, the second external thread, the first internal thread, and the second internal thread including identical pitches. An enlarged head is adjacent to the second end. The anchor nut additionally includes a first open end, a second open end, the first hole extends through the anchor nut from the first open end to the second open end, the head is proximate to the first open end, and the second external thread is proximate to the second open end. The anchor nut has a radial bearing surface between the head and the second external thread. The locknut includes a first or inner side, a second or outer side, a first dimension from the first side to the second side, the second hole extends through the locknut from the first side to the second side, and the anchor nut includes a second dimension from the radial bearing surface to the second open end. In one embodiment, the second dimension is less than the first dimension, the first internal thread extends from the first open end to a runout between the first open and the second open end, and the first hole is unthreaded from the runout to the second open end. In another embodiment, the second dimension is greater than the first dimension, and the first internal thread extends from the first open end to the second open end.

BRIEF DESCRIPTION OF THE DRAWINGS

Specific objects and advantages of the invention will be readily apparent to those skilled in the art from the following detailed description of illustrative embodiments thereof, taken in conjunction with the drawings in which.

DETAILED DESCRIPTION

Improved bolts, bolt and nut fasteners, and bolted joints are disclosed.

I

Figure 1:
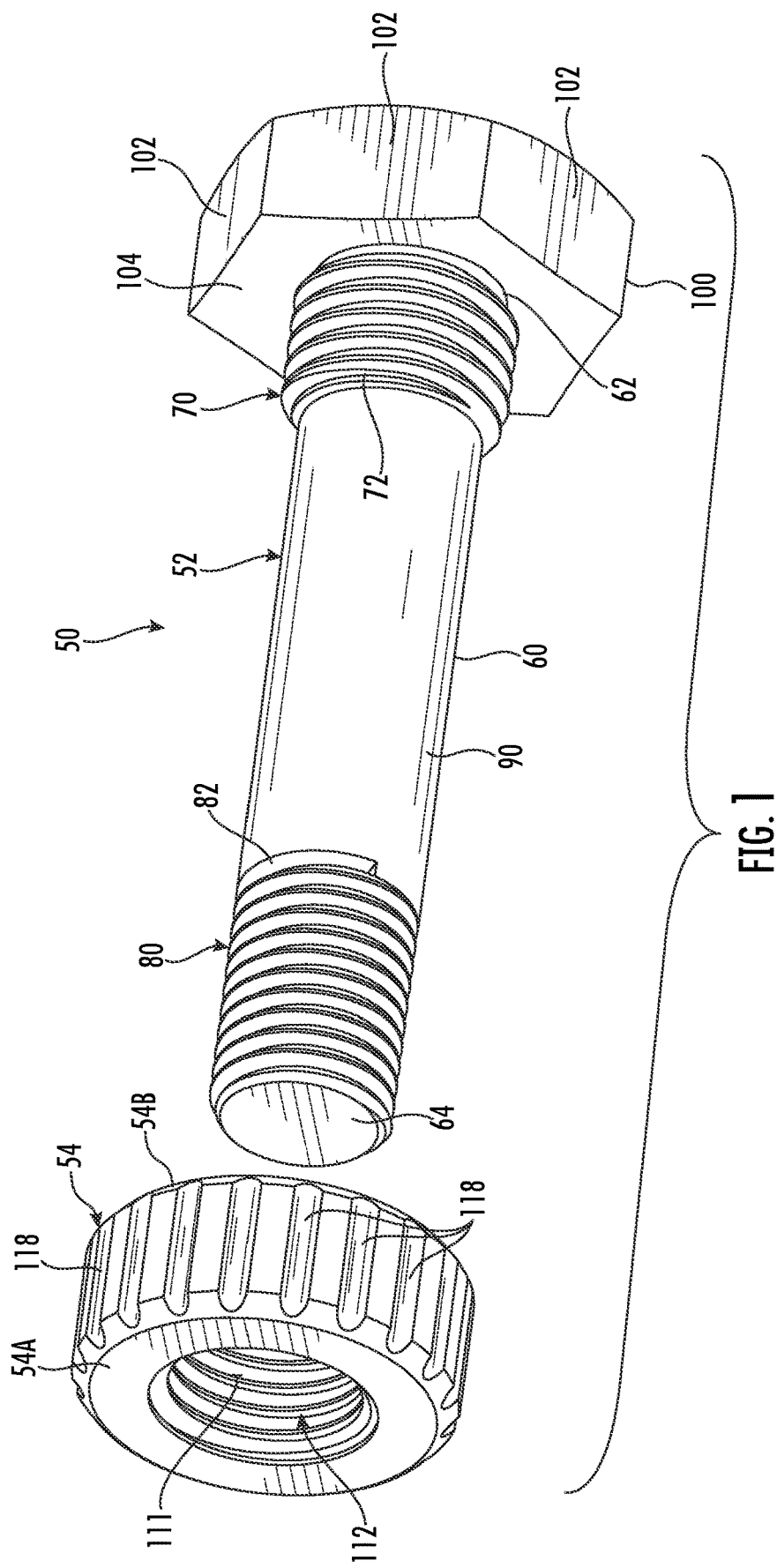
FIGS. 1 and 2 are perspective views of a fastener constructed and arranged according to the invention, the fastener including a bolt and a nut shown disassembled.
Figure 2:
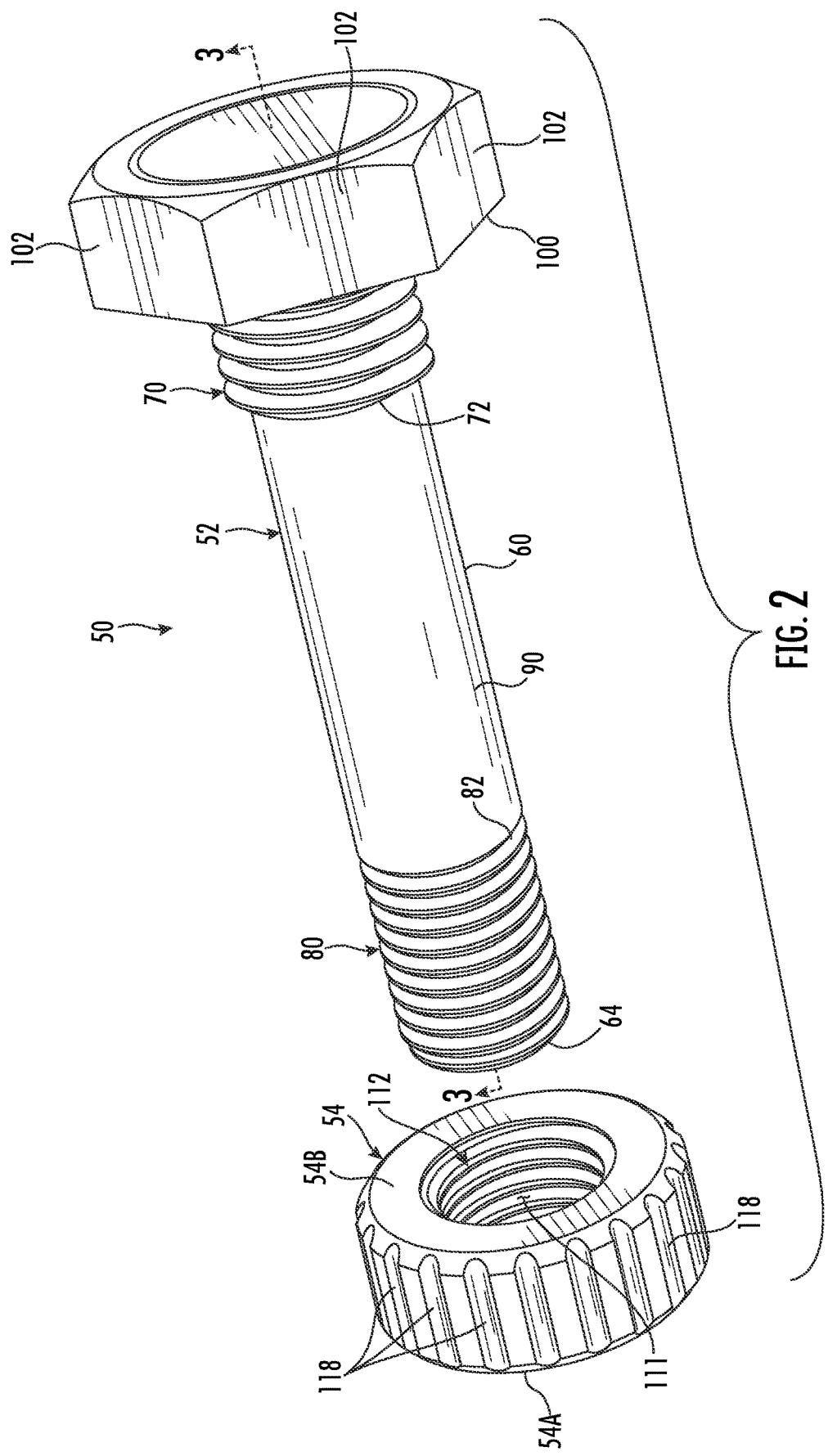

Turning now to the drawings, like reference characters indicating corresponding elements throughout the several views, FIGS. 1 and 2 illustrate fastener 50 constructed and arranged according to the invention. Fastener 50 is useful in forming bolted joints and includes bolt 52 and nut 54 configured to be repeatedly and quickly assembled and disassembled. All diameters referenced throughout this specification related to fastener 50 are constant.

Figure 3:
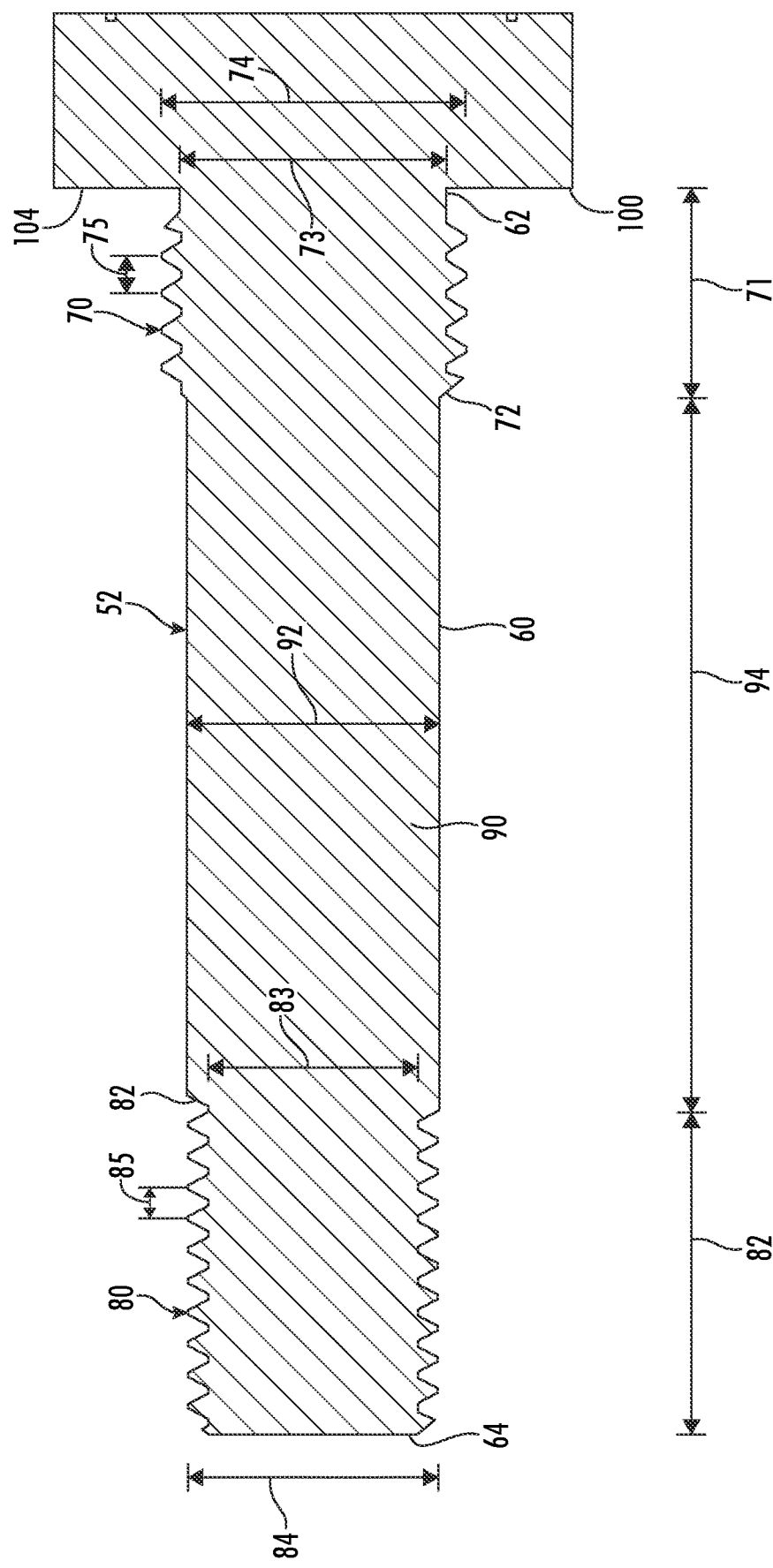
FIG. 3 is a central longitudinal section view along line 3-3 of FIG. 2.

In FIGS. 1, 2, and 3, bolt 52 includes longitudinally straight cylindrical shank 60 extending from proximal end 62 configured with enlarged head 100 to distal end 64, and external threads 70 and 80 on either side of unthreaded body 90, including a diameter 92 in FIG. 3. Head 100 has wrench flats 102, six in this example, for bolt-turn purposes, and underside 104. Shank 60 extends outwardly to distal end 64 from proximal end 62 affixed centrally to underside 104 of head 100. Radial bearing surface or radius 104A of underside 232 radiates outwardly from body 90.

In FIGS. 1-3, external thread 70 near head 100 twists in a left-hand direction and is exemplary of a standard left-handed external thread. In FIG. 3, external thread 70 includes thread length 71 extending from closely adjacent to proximal end 62 and radial bearing surface 104 to runout 72 on a proximal side of body 70, minor diameter 73, major diameter 74, and pitch 75, the distance between adjacent peaks or crests of the thread. Minor diameter 73 occurs at the roots of external thread 70, and major diameter 74 occurs at the crests of external thread 70.

In FIGS. 1-3, external thread 80 near distal end 64 twists in a right-hand direction opposite to the left-hand direction of external thread 70 and is exemplary of a standard right-handed external thread. In FIG. 3, external thread 80 includes thread length 81 extending from distal end 64 to runout 82 on a distal side of body 70, minor diameter 83, major diameter 84, and pitch 85, the distance between adjacent peaks or crests of the thread. Minor diameter 83 occurs at the roots of external thread 80. Major diameter 84 occurs at the crests of external thread 80.

External threads 70 and 80 twist in opposite directions, as described. Accordingly, external threads 70 and 80 are counter-threads configured to threadedly receive counter-rotating internally-threaded elements. External thread 70 is the proximal left-handed external thread of bolt 52 near or otherwise proximate to radial bearing surface 104 of head 100. External thread 80 opposite to external thread 70 is the distal right-handed external thread proximate to distal end 64. Thread length 81 of external thread 80 is greater than thread length 71 of external thread 70 and less than grip length 94 of body 90 extending from runout 72 to runout 82. Grip length 94 is the length of the unthreaded portion of shank 60, namely, body 90. Grip length 94 is the free length of bolt 52 that is stretched under tension. Pitch 75 is slightly larger than pitch 85, and this can be reversed in an alternate embodiment. Pitches 75 and 85 can be the same in a specific embodiment. Minor diameter 73 of external thread 70 is larger than diameter 92 of body 90 and major diameter 84 of external thread 80. Accordingly, external thread 70 is the major external thread of bolt 52, and external thread 80 is the minor external thread of bolt 52.

Figure 6:
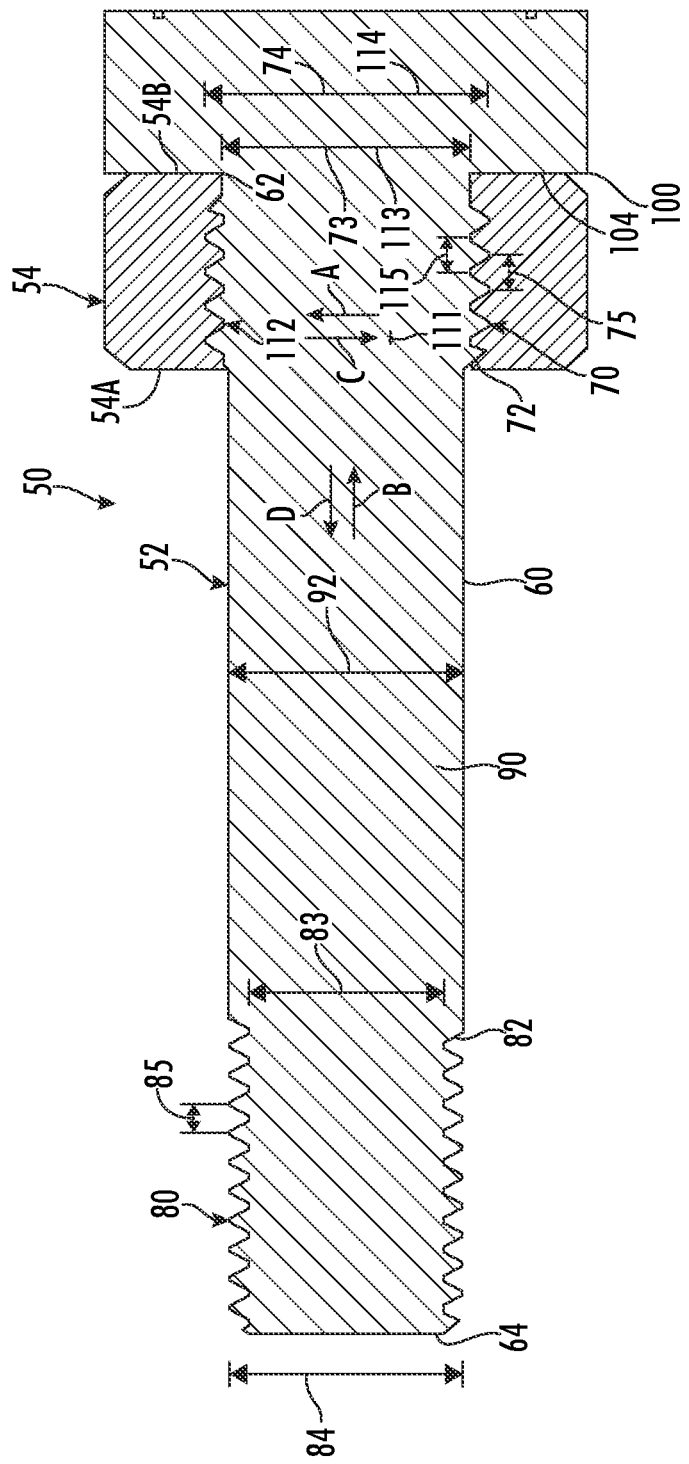
FIG. 6 is a central longitudinal section view along line 6-6 of FIG. 5.

In FIGS. 1 and 2, nut 54 and is an annular block configured with a threaded hole 111, including internal thread 112. Threaded hole 111 extends through nut 54 from an inner side 54A of nut 54 to an outer side 54B of nut 54. Inner and outer sides 54A and 54B of nut 54 are radial bearing surfaces. Nut 54 has a thickness from inner side 54A to outer side 54B. Internal thread 112 runs along the inside of nut 54 between the opposed inner and outer sides 54A and 54B and twists in the same left-hand direction as external thread 70. In FIG. 6, internal thread 112 includes minor diameter 113, major diameter 114, and pitch 115, the distance between adjacent peaks or crests of the thread. Minor diameter 113 occurs at the crests of internal thread 112, and major diameter 114 occurs at the roots of internal thread 112. Pitches 75 and 115 are identical. Minor diameter 113 of internal thread 112 is greater than diameter 92 of body 90 and major diameter 84 of external thread 80. Minor and major diameters 113 and 114 of internal thread 112 correspond to the respective minor and major diameters 73 and 74 of external thread 70. External thread 70 and internal thread 112 correspond by being the same size and having identical pitches.

Since minor diameter 113 of internal thread 112 is greater than major diameter 84 of external thread 80 and diameter of body 90, threaded hole 111 is configured to receive therethrough in a direction from outer side 54B of body 54 to inner side 54A of body 54 distal end 64 shank 60 and sequentially pass over external thread 80 and body 90 to runout 72 of external thread 70 without interference from external thread 80. Since pitch 115 of internal thread 112 and pitch 75 of external thread 70 are the same, minor and major diameters 113 and 114 of internal thread 112 correspond to the respective minor and major diameters 73 and 74 of external thread 70, internal thread 112 twists in the same left-hand direction as external thread 70, and internal and external threads 112 and 70 are correspondingly sized, internal thread 112 corresponds to and is configured to thread rotationally over and on external thread 70 from runout 72 in the direction of arrow B in FIGS. 4-6 when rotated in the direction of arrow A and off external thread 70 from runout 72 in the direction of arrow D when rotated in the direction of arrow C. Accordingly, internal thread 112 corresponds to and is configured to thread over and on external thread 70 but not on external thread 80.

Figure 4:
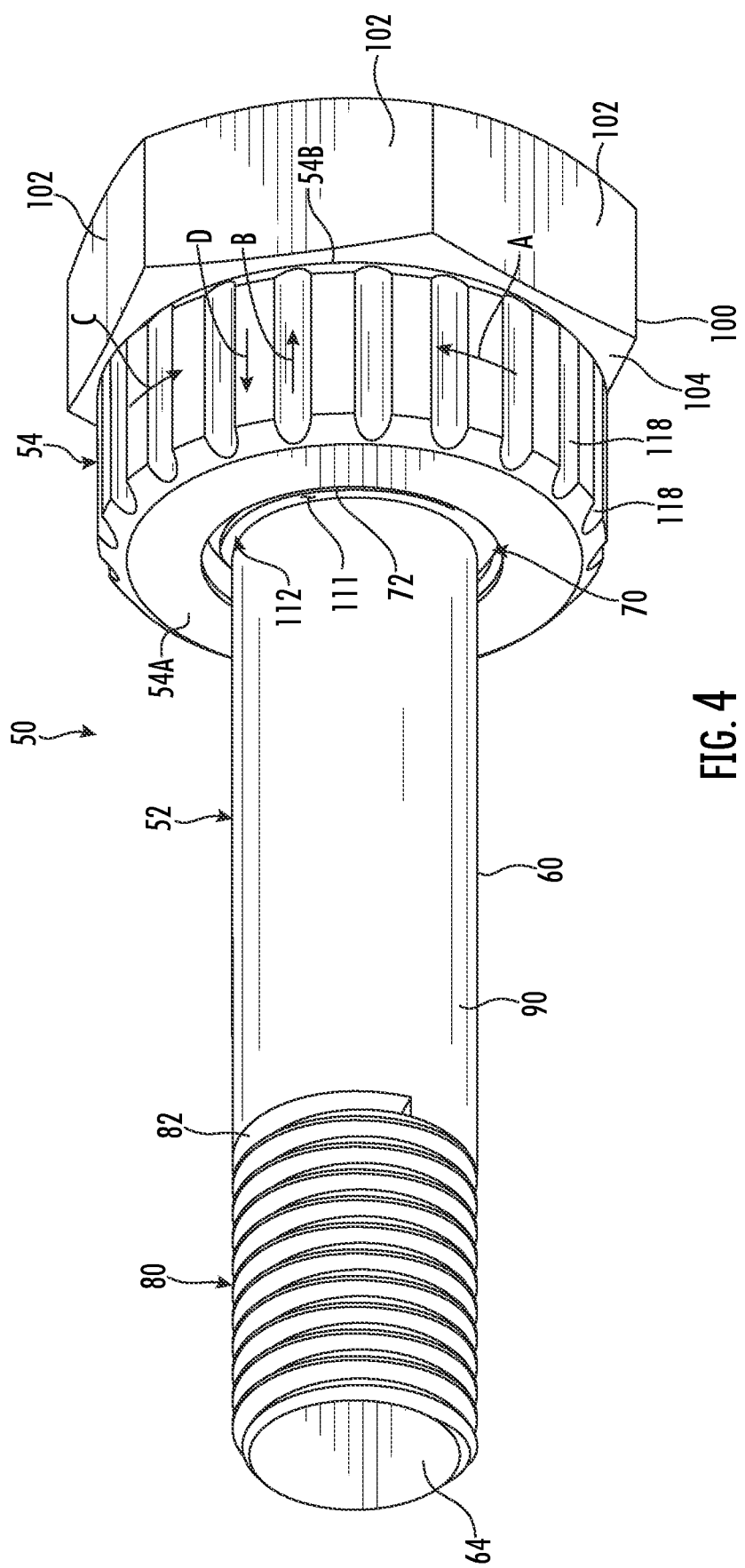
FIGS. 4 and 5 are perspective views of the fastener of FIGS. 1 and 2 showing the bolt and the nut assembled.
Figure 5:
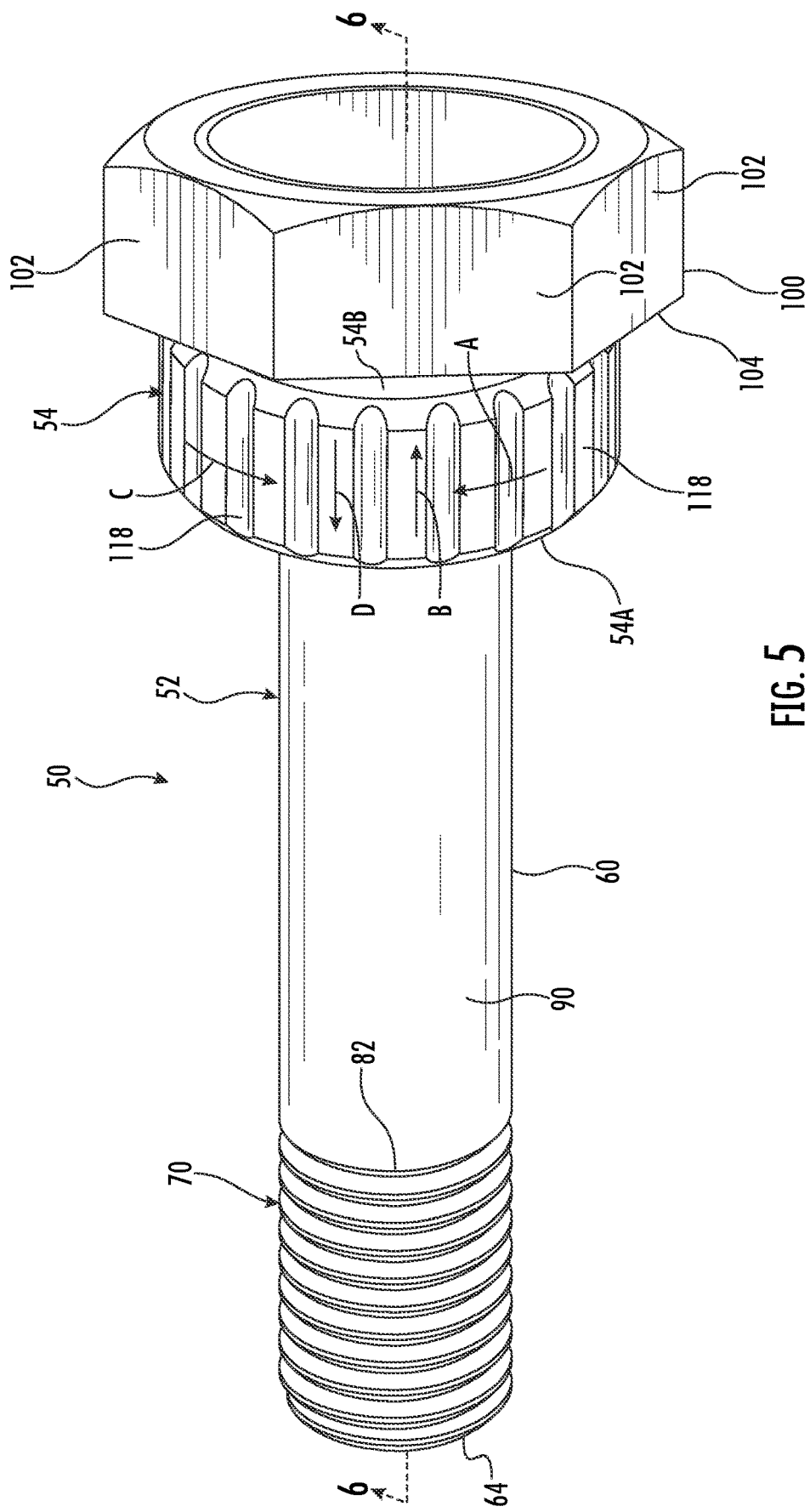

Nut 54 advances toward underside 104 of head 100 and away from distal end 64 in the direction of arrow B in FIGS. 4-6, when nut is 54 is rotated over and on external thread 70 in a counterclockwise direction of arrow A in FIGS. 4 and 5 when seen from the point of view facing distal end 64 on the central longitudinal axis of shank 60. Nut 54 is suitably sized to extend entirely over external thread 70 from outer side 54B of nut 54 tightened directly against underside 104 of head 100 to inner side 54A of nut 54 proximate to body 90 outboard of external thread 70 in the assembled fastener 50, when nut 54 is tightened directly against underside 104 of head 100 by rotating it in the direction of arrow A tightly against underside 104 of head 100. Nut 54 withdraws from underside 104 of head 100 and away from distal end 64 in the direction of arrow D in FIGS. 4-6 when nut 54 is rotated on external thread 70 in a clockwise direction of arrow C in FIGS. 4 and 5 when seen from the point of view facing distal end 64 on the central longitudinal axis of shank 60. Once nut 54 is free from external thread 70, the user may withdraw nut 54 from bolt 52 in the direction of arrow D to separate nut 54 from bolt 52. The described process for assembling and disassembling fastener 50 is repeatable is needed. In FIGS. 1, 2, 4, and 5, nut 54 has parallel and circumferentially spaced-apart wrench grooves 118 for nut-turn purposes. Repeated reference to the described directions of arrows A, B, C, and D is made throughout this specification with the various embodiments disclosed herein and used in the various figures for reference purposes.

Figure 7:
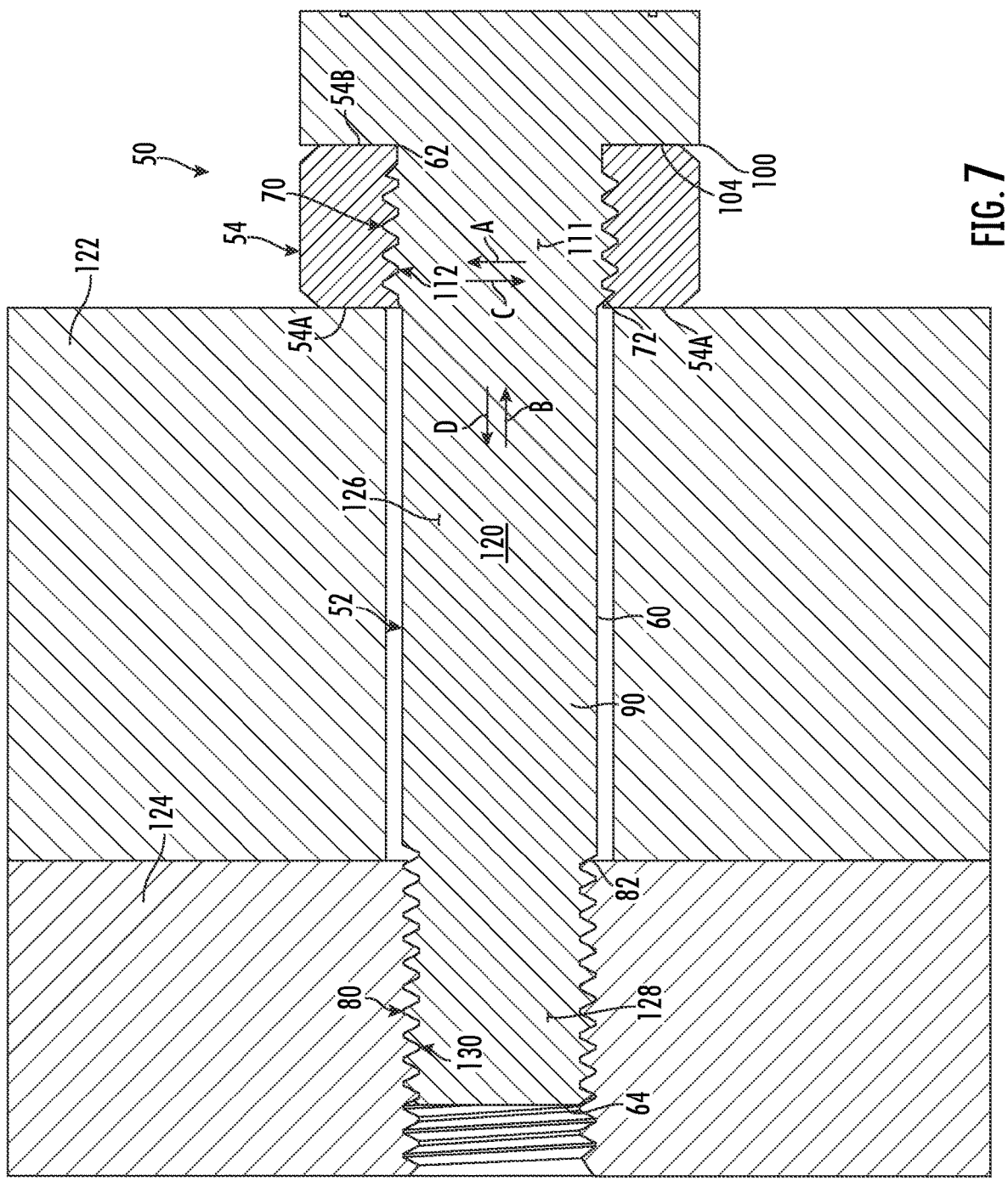
FIG. 7 is a view corresponding to FIG. 6 illustrating the fastener in use.

The assembled fastener 50 in FIGS. 4-6 is useful in forming bolted joints, such as bolted joint 120 in FIG. 7. FIG. 7 illustrates two members 122 and 124 secured together by assembled fastener 50. Members 122 and 124, metal plates in this example, have registered through bores 126 and 128, respectively. Bore 128 is tapped with internal thread 130, and is exemplary of a tapped or internally threaded bore 128. Thread 130 is a right-hand thread and corresponds to external thread 80, enabling it to thread conventionally on external thread 80 when bolt 52 is turned in the direction of arrow A.

A user forms bolted joint 120 with fastener 50 to secure members 122 and 124 together by inserting bolt 60 distal end 64 first into and through bore 126 to bore 128. He threads internal thread 130 over and on external thread 80 and advances bolt 52 in the direction of arrow D by rotating bolt 52 in the direction of arrow A until inner side 54A of nut 54 tightens against member 122. Bolt length 94, the free length of bolt 52 that is stretched under tension, extends through bore 126 of member 122 to external thread 80 threaded to internally threaded bore 128. He alternately rotates nut 54 and bolt 52 in the direction of arrow A while holding the other one stationary. This alternately tightens outer side 54B of nut 54 against underside 104 of head 100 and inner side 54A of nut 54 against member 122 until the desired tension is achieved, tightly clamping member 122 between member 124 and inner side 54A of nut 54 and tightly clamping nut 54 between underside 104 of head 100 and member 122. Since rotation of bolt 52 in the direction of arrow A urges bolt 52 in the direction of arrow D and rotation of nut 54 relative to bolt 52 in the same direction of arrow A urges nut 54 in the opposite direction of arrow B, nut 54 with its outer side 54B tightened directly against underside 104 of head 100 and its inner side 54A tightened directly against member 122 disables bolt 52 from loosening by rotating in the direction of arrow C. Accordingly, nut 54 serves as a locknut counter-rotated relative to bolt 52 aggressively disabling bolt 52 from loosening by rotating in the direction of arrow C. Fastener 50 securing bolted joint 120 is surprisingly strong and aggressive and resistant to axial failure, shear failure, and loosening in response to vibrational and prevailing torsional forces. Nut 54 additionally serves to distribute the load of fastener 50. The user need only reverse this operation to release bolted joint 120 and withdraw fastener 50. The skilled artisan will readily appreciate that handedness of the threads described in conjunction with fastener 50 can be reversed in alternate embodiments.

Figure 8:
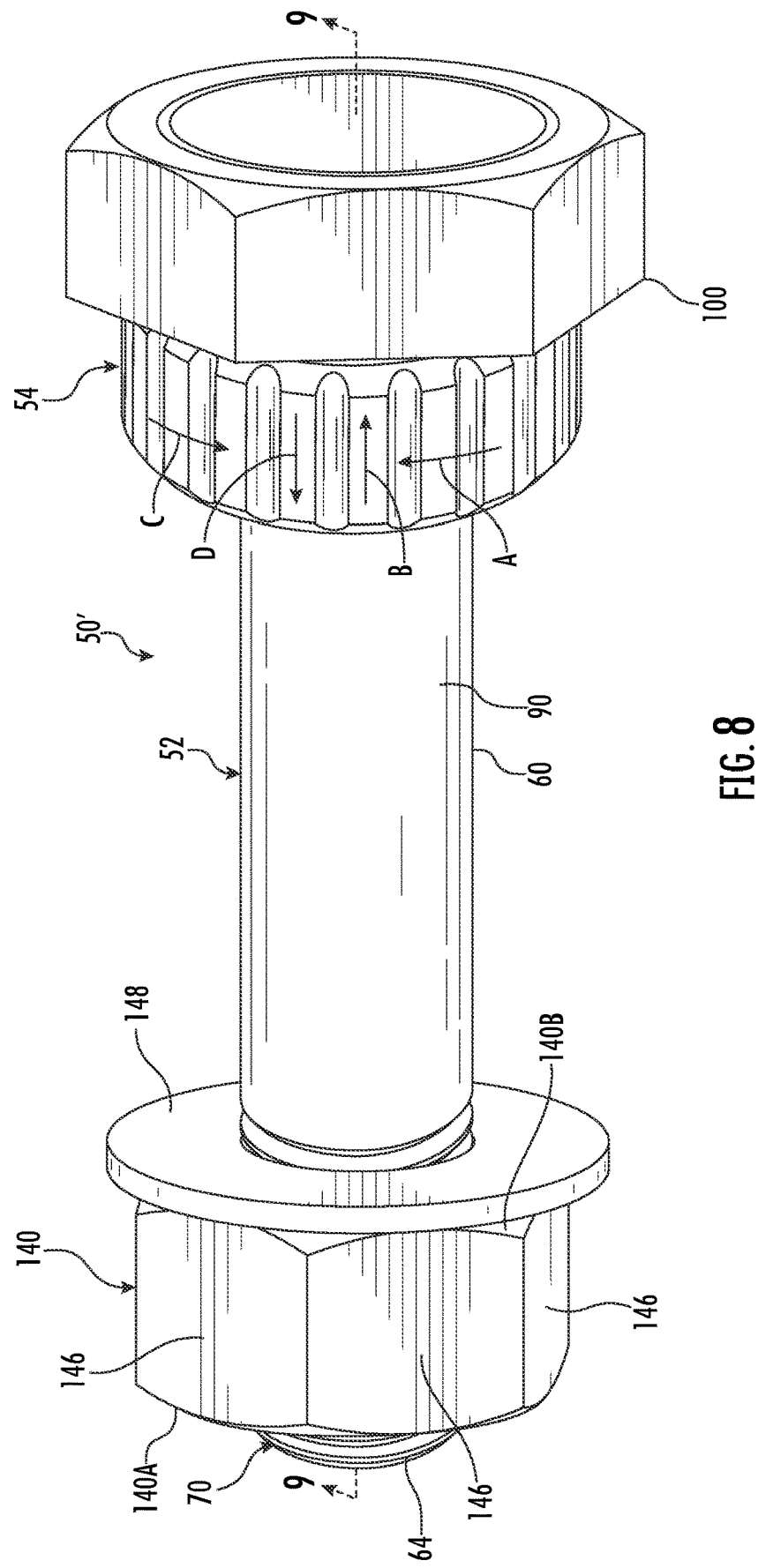
FIG. 8 is a perspective view of another embodiment of a fastener constructed and arranged according to the invention.
Figure 9:
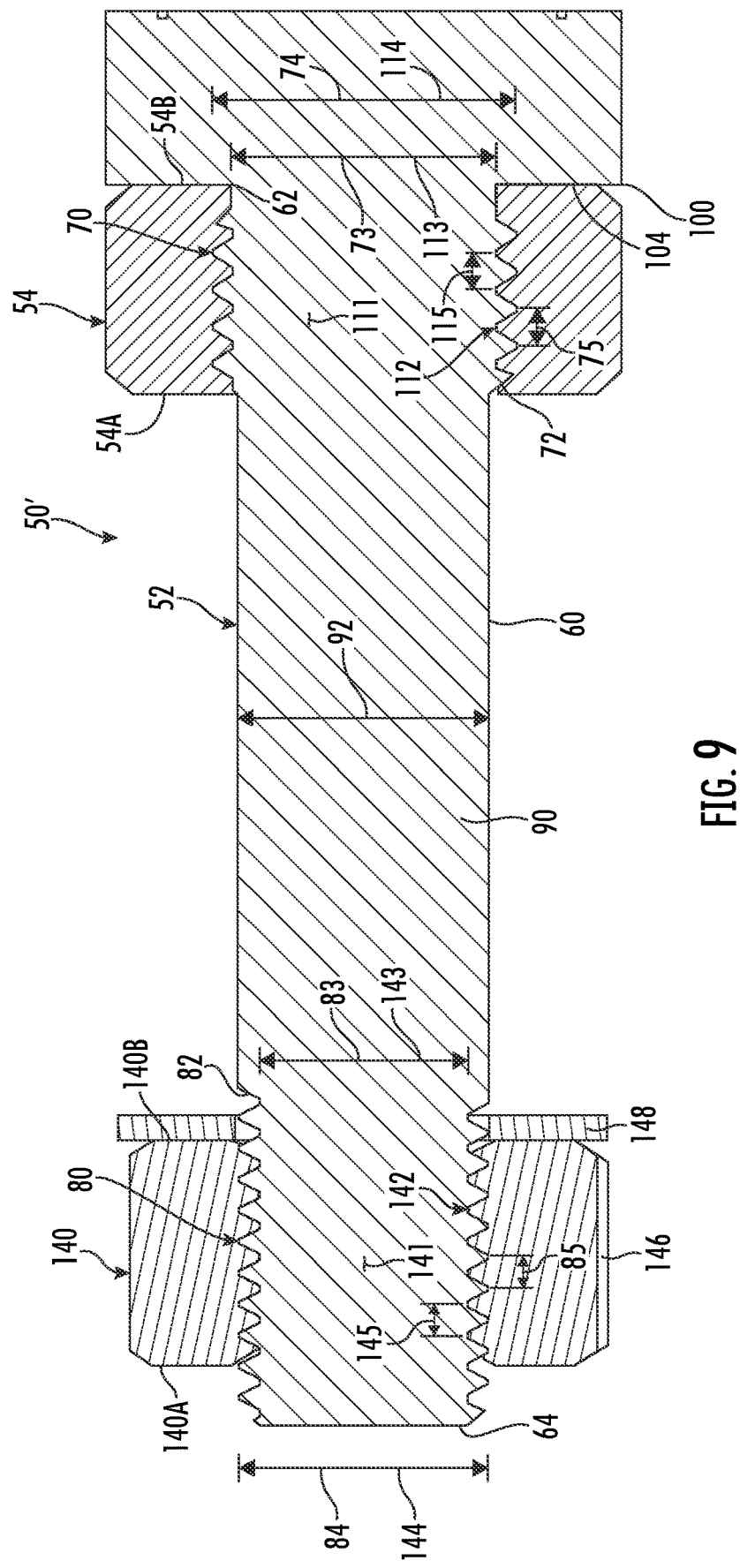
FIG. 9 is a central longitudinal section view along line 9-9 of FIG. 8.
Figure 10:
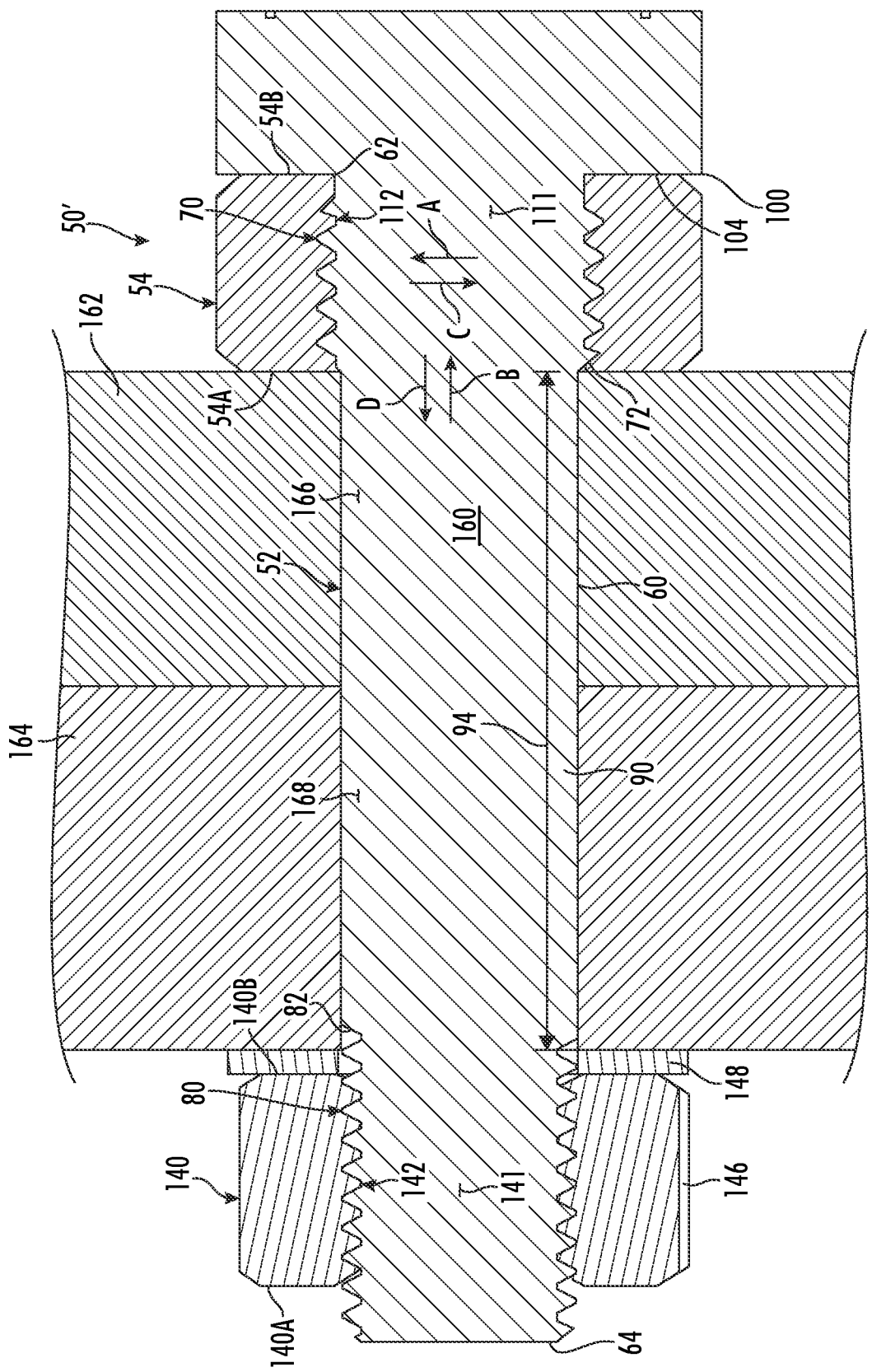
FIG. 10 is a view corresponding to FIG. 9 illustrating the fastener in use.

The assembled fastener 50 in FIGS. 4-6 is also useful with a nut 140 and washer 148 in FIG. 8 to form an alternate embodiment of a fastener 50' useful in forming bolted joint 160 in FIG. 10, including members 162 and 164 secured together by fastener 50'. Fastener 50' is the assembly of bolt 52, nut 54, nut 140, and washer 148. Members 162 and 164 in FIG. 10, metal plates in this example, have registered through bores 166 and 168, respectively. FIG. 9 is a section view along 9-9 of fastener 50' of FIG. 8 illustrating the assembly of bolt 52, nut 54, nut 140, and washer 148. The assembly of bolt 52 and nut 54 in FIGS. 9 and 10 incorporate the reference characters as fastener 50 in FIGS. 6 and 7.

Nut 140 is an annular block configured with a threaded hole 141, including internal thread 142. Threaded hole 141 extends through nut 140 from an inner side 140A of nut 140 to an outer side 140B of nut 140. Inner and outer sides 140A and 140B of nut 140 are radial bearing surfaces. Internal thread 142 runs along the inside of nut 140 between the opposed inner and outer sides 140A and 140B and twists in the same right-hand direction as external thread 80. Internal thread 142 includes minor diameter 143, major diameter 144, and pitch 145, the distance between adjacent peaks or crests of the thread. Minor diameter 143 occurs at the crests of internal thread 142, and major diameter 144 occurs at the roots of internal thread 142. Pitch 145 is identical to pitch 85. Minor and major diameters 143 and 144 of internal thread 142 correspond to the respective minor and major diameters 83 and 84 of external thread 80. Since pitch 145 of internal thread 142 and pitch 85 of external thread 80 are the same, minor and major diameters 143 and 114 of internal thread 142 correspond to the respective minor and major diameters 83 and 84 of external thread 80, internal thread 142 twists in the same right-hand direction as external thread 80, and internal and external threads 142 and 80 are correspondingly sized, internal thread 142 corresponds to and is configured to thread rotationally over and on external thread 80 from distal end 64 and off external thread 80 from distal end 64. External thread 80 and internal thread 142 correspond by being the same size and having identical pitches.

In FIG. 10, a user forms bolted joint 160 with fastener 50' to secure members 162 and 164 together by inserting bolt 60 distal end 64 first into and through bore 166 to bore 168 to bring inner side 54A of nut 54 against member 162 on one side of the bolted joint 160 and extend external thread 80 outwardly from bore 168 to distal end 64 on the opposite side of the bolted joint 160. The user locates washer 148 over external thread 80. He threads internal thread 142 on external thread 80 by inserting distal end 64 into threaded hole 141 and rotating nut 140 in the direction of arrow C. This advances nut 140 in the direction of arrow B until nut 140 is tightened directly against washer 148 initially clamped between outer side 140B of nut 54 and member 164. Bolt length 94 extends through bores 166 and 168 to external thread 80, extending outwardly from bore 166 to distal end 64. He either holds nut 140 from rotating or urges rotation of nut 140 in the direction of arrow C and at the same time alternately rotates nut 54 and bolt in the direction of arrow A while holding the other one stationary as in joint 120. As described above, this alternately tightens outer side 54B of nut 54 against underside 104 of head 100 and inner side 54A of nut 54 against member 122 until the desired tension is achieved, tightly clamping members 162 and 164 between washer 148 and inner side 54A of nut 54 and tightly clamping nut 54 between underside 104 of head 100 and member 162. Nut 54 serves as a locknut counter-rotated relative to bolt 52 aggressively disabling bolt 52 from loosening by rotating in the direction of arrow C in bolted joint 160 as in bolted joint 120. Fastener 50' securing bolted joint 160 is surprisingly strong and aggressive and resistant to axial failure, shear failure, and loosening in response to vibrational and prevailing torsional forces. Nut 54 serves to distribute the load of fastener 50' as described above in bolted joint 120. The user need only reverse this operation to release bolted joint 160 and withdraw fastener 50'. The skilled artisan will readily appreciate that handedness of the threads described in conjunction with fastener 50' can be reversed in alternate embodiments.

II

Figure 11:
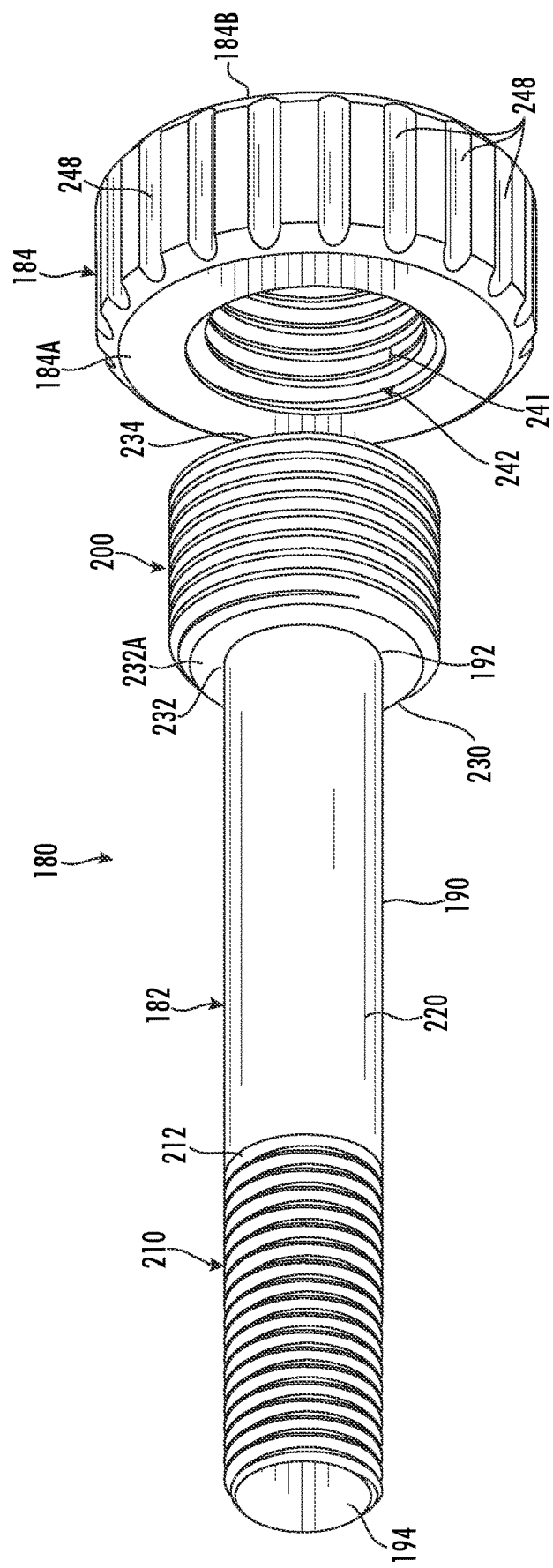
FIGS. 11 and 12 are perspective views of a yet another embodiment of a fastener constructed and arranged according to the invention, the fastener including a bolt and a nut shown disassembled.
Figure 12:
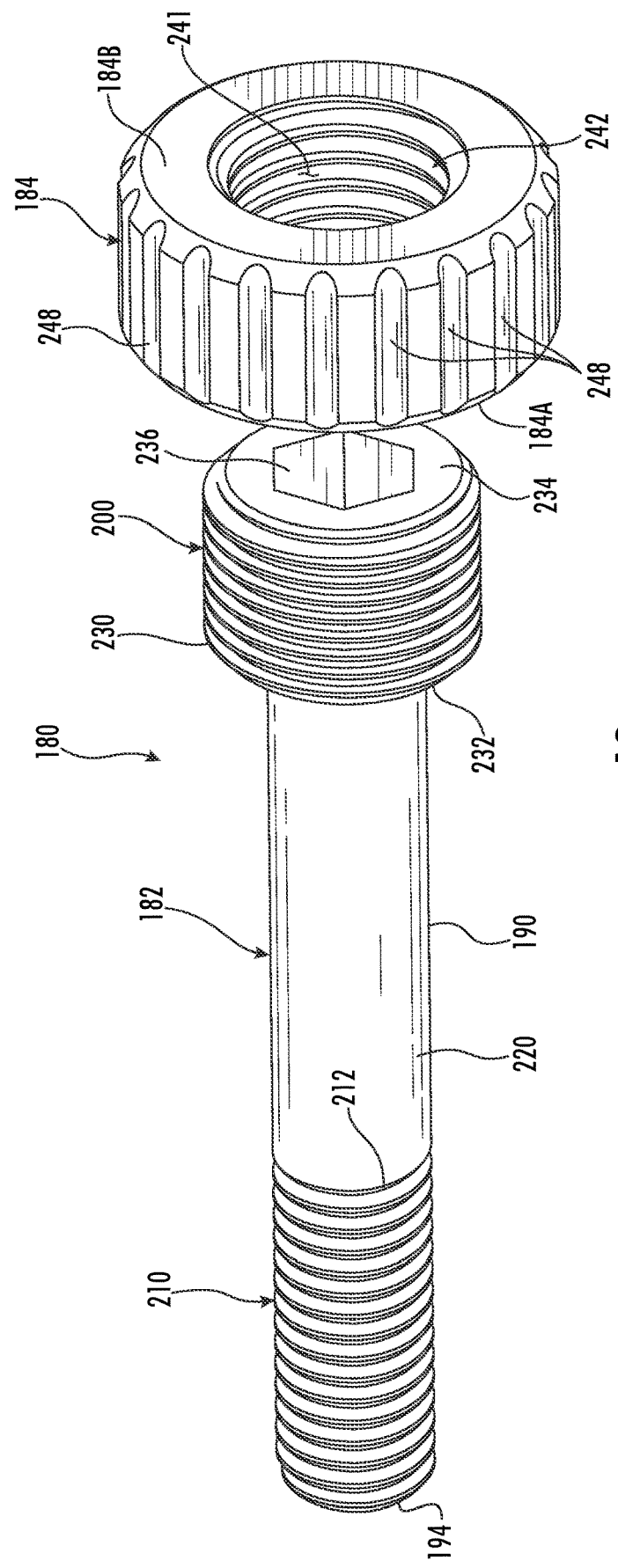
Figure 13:
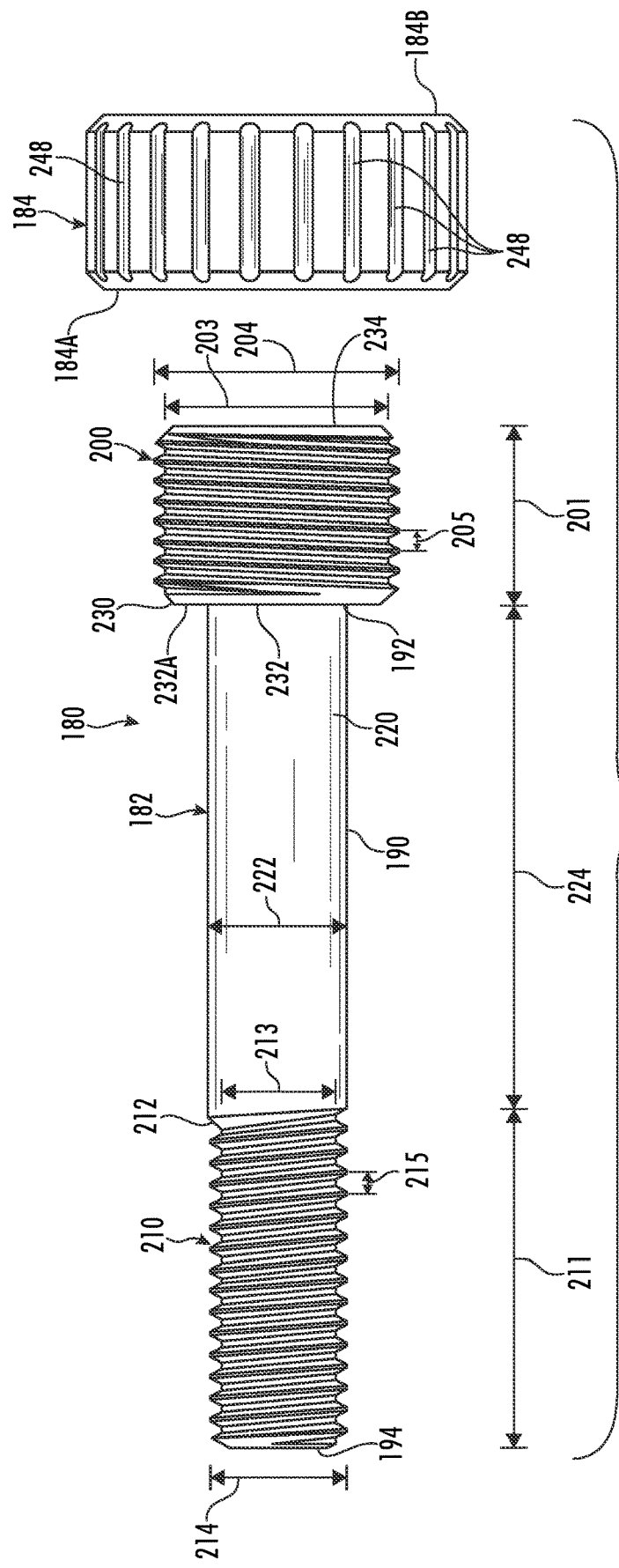
FIG. 13 is a side elevation view of the fastener of FIGS. 11 and 12 showing the bolt and the nut assembled.

FIGS. 11-13 illustrate another embodiment of a fastener 180 constructed and arranged according to the invention. Fastener 180 is useful in forming bolted joints and includes bolt 182 and nut 184 is configured to be repeatedly and quickly assembled and disassembled. All diameters referenced throughout this specification related to fastener 180 are constant.

Bolt 182 includes longitudinally straight cylindrical shank 190 extending from proximal end 192 configured with enlarged head 230 to distal end 194. External threads 200 and 210 are on either side of unthreaded body 220, including a diameter 222 in FIG. 13. Head 230, an enlarged cylindrical body, includes underside 232 and opposed outer side 234. Head 230 is circumferentially enlarged relative to shank 190 and is externally threaded with thread 200 extending between underside 232 and outer side 234. Shank 190 extends outwardly to distal end 194 from proximal end 192 affixed centrally to underside 232 of head 230. Radial bearing surface or radius 232A of underside 232 radiates outwardly from body 220 to external thread 200. In FIG. 12, blind keyway 236 for bolt-turn purposes extends into head 230 centrally from outer side 234. All diameters referenced related to fastener 180 are constant.

In FIGS. 11-13, external thread 200 near proximal extremity 192 twists in a left-hand direction and is exemplary of a standard left-handed external thread. In FIG. 13, external thread 200 includes thread length 201 extending between underside 232 adjacent to proximal end 192 and outer side 234, minor diameter 203, major diameter 204, and pitch 205, the distance between adjacent peaks or crests of the thread. Minor diameter 203 occurs at the roots of external thread 200, and major diameter 204 occurs at the crests of external thread 200.

External thread 210 near distal end 194 twists in a right-hand direction opposite to the left-hand direction of external thread 200 and is exemplary of a standard right-handed external thread. In FIG. 13, external thread 200 includes thread length 211 extending from distal end 194 to runout 212, minor diameter 213, major diameter 214, and pitch 215, the distance between adjacent peaks or crests of the thread. Minor diameter 213 occurs at the roots of external thread 210. Major diameter 214 occurs at the crests of external thread 200.

External threads 200 and 210 twist in opposite directions, as described. Accordingly, external threads 200 and 210 are counter-threads configured to threadedly receive counter-rotating internally-threaded elements. External thread 200 is the proximal left-handed external thread of bolt 182 proximate to proximal end 192. External thread 210 opposite to external thread 200 is the distal right-handed external thread of bolt 182 proximate to distal end 194. Thread length 211 of external thread 210 is greater than thread length 201 of external thread 200 and less than grip length 224 of body 220 extending from underside 232 of externally-threaded head 230 to runout 212. Grip length 224, the length of the unthreaded portion of shank 190, namely, body 220, is the free length of bolt 182 that is stretched under tension. Pitches 205 and 215 are identical. Minor diameter 203 of external thread 200 is larger than diameter 222 of body 190 and major diameter 214 of external thread 210. Accordingly, external thread 200 is the major external thread of bolt 182, and external thread 210 is the minor external thread of bolt 182. External threads 200 and 210 are the same size and have identical pitches.

Figure 16:
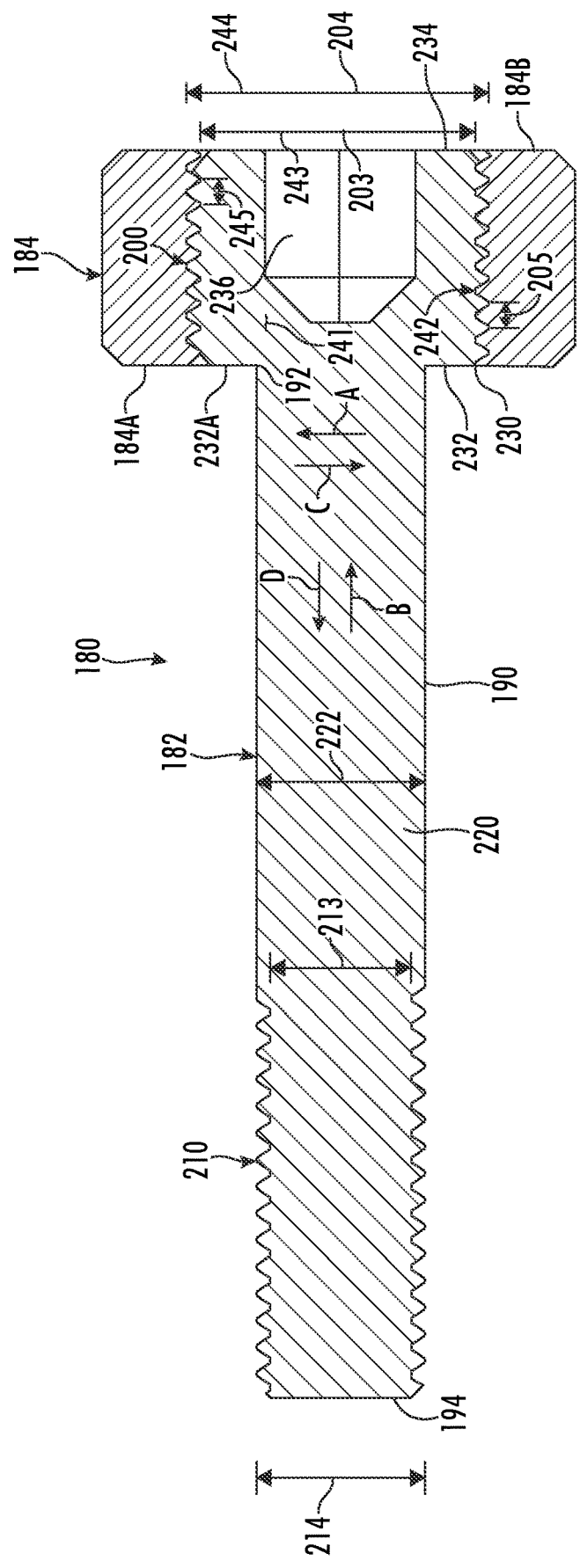
FIG. 16 is a central longitudinal section view along line 16-16 of FIG. 15.

In FIGS. 11 and 12, nut 184 is an annular block configured with a threaded hole 240, including internal thread 242. Threaded hole 240 extends through nut 184 from an inner side 184A of nut 184 to an outer side 184B of nut 184. Inner and outer sides 184A and 184B of nut 184 are radial bearing surfaces. Nut 184 has a thickness from inner side 184A to outer side 184B. Internal thread 142 runs along the inside of nut 184 between the opposed inner and outer sides 184A and 184B and twists in the same left-hand direction as external thread 200. In FIG. 16, internal thread 242 includes minor diameter 243, major diameter 244, and pitch 245, the distance between adjacent peaks or crests of the thread. Minor diameter 243 occurs at the crests of internal thread 242, and major diameter 244 occurs at the roots of internal thread 242. Pitches 205, 215, and 245 are identical. Minor diameter 243 of internal thread 242 is greater than diameter 222 of body 220 and major diameter 214 of external thread 210. Minor and major diameters 243 and 244 of internal thread 242 correspond to the respective minor and major diameters 203 and 204 of external thread 200. External thread 200 and internal thread 242 correspond by being the same size and having identical pitches. Further, external threads 200 and 210 and internal thread 242 are the same size and have identical pitches.

Since pitch 245 of internal thread 242 and pitch 205 of external thread 200 are the same, minor and major diameters 243 and 244 of internal thread 242 correspond to the respective minor and major diameters 203 and 204 of external thread 200, internal thread 242 twists in the same left-hand direction as external thread 200, and internal and external threads 242 and 200 are correspondingly sized, internal thread 242 corresponds to and is configured to thread rotationally over and on external thread 200 and off external thread 200 from outer side 234 of head 230. Accordingly, internal thread 242 corresponds to and is configured to thread over and on external thread 200 but not on external thread 210.

Figure 14:
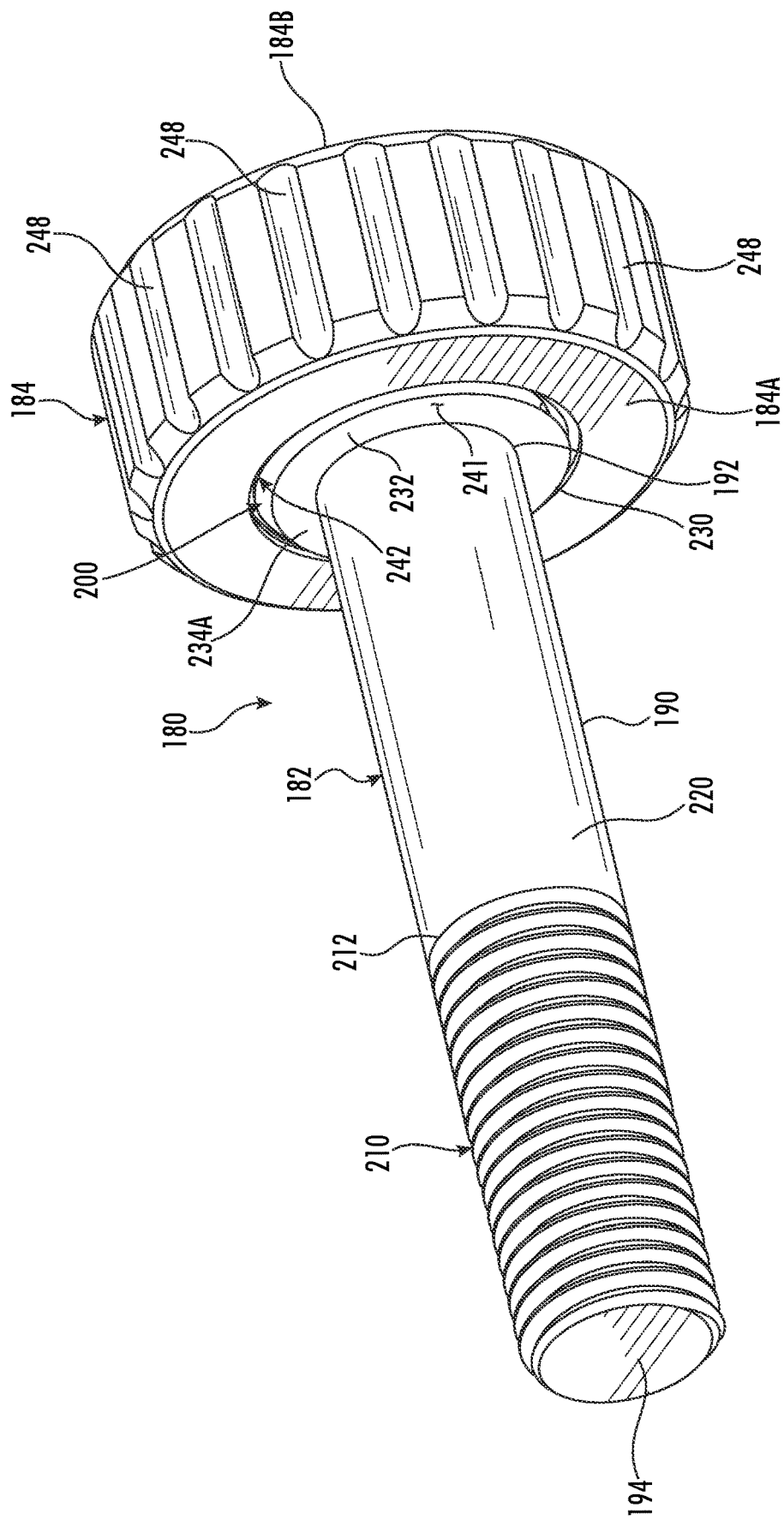
FIGS. 14 and 15 are perspective views of the fastener of FIGS. 11 and 12 shown assembled.
Figure 15:
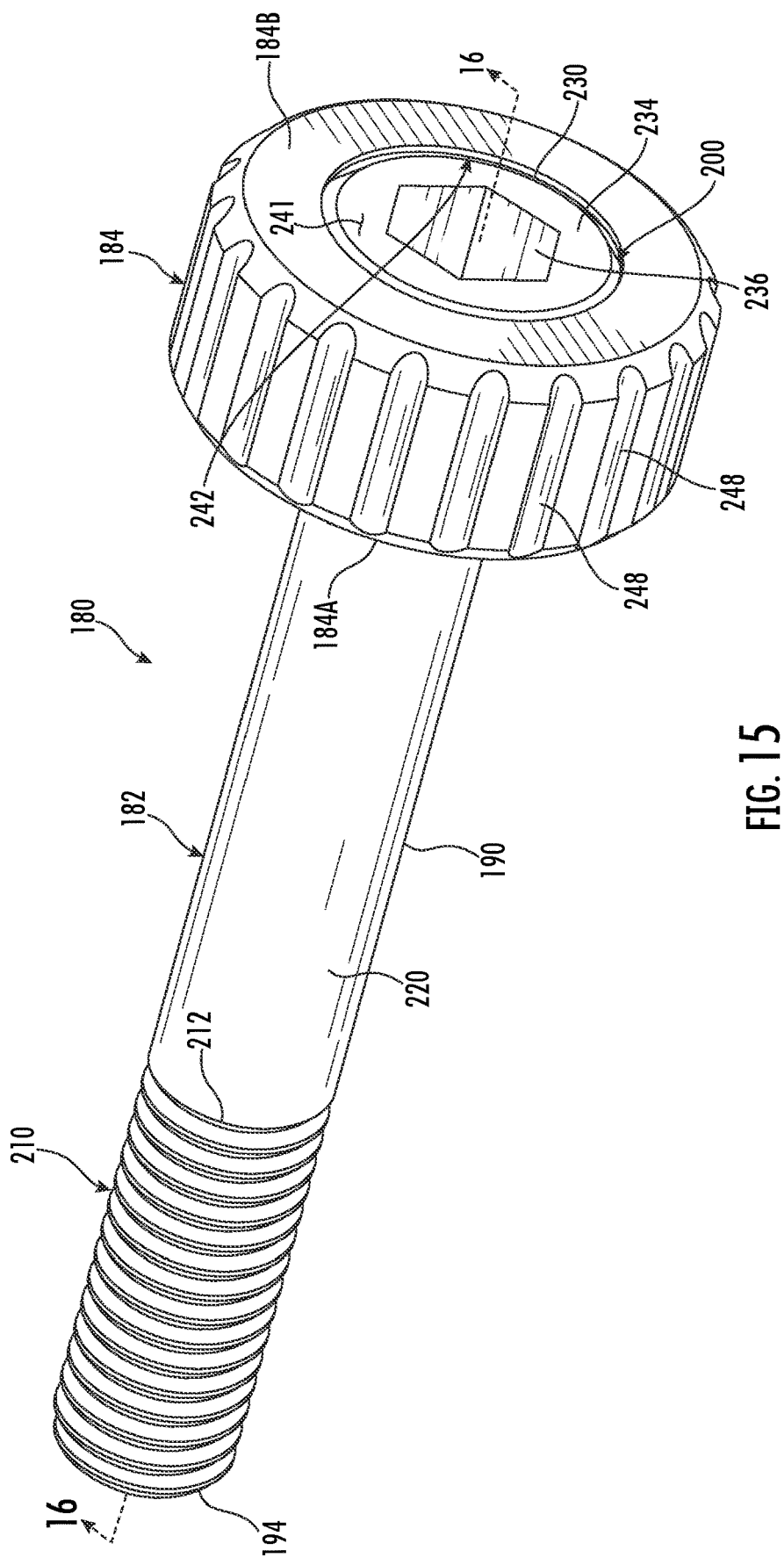

A user assembles fastener 180 in FIGS. 14, 15, and 16 by inserting bolt 182 outer side 234 of head 230 first into threaded hole 241 from inner outer side 184A. He advances nut 184 in the direction of arrow D toward underside 232 of head 230 by rotating nut 184 in the direction of arrow A over external thread 200. Nut 184 is suitably sized to extend entirely over external thread 200 from inner side 184A of nut 184 proximate to underside 232 of head 230 to outer side 184B of nut 184 proximate to outer side 234 of head 230, when internal thread 242 is completely threaded over external thread 200 in the assembled fastener 180 in FIGS. 14-16. A user withdraws nut 184 from head 230 to disassemble fastener 180 by reversing this operation. The described process for assembling and disassembling fastener 180 is repeatable as needed. In FIGS. 11-15, nut 184 has parallel and circumferentially spaced-apart wrench grooves 248 for nut-turn purposes.

Figure 17:
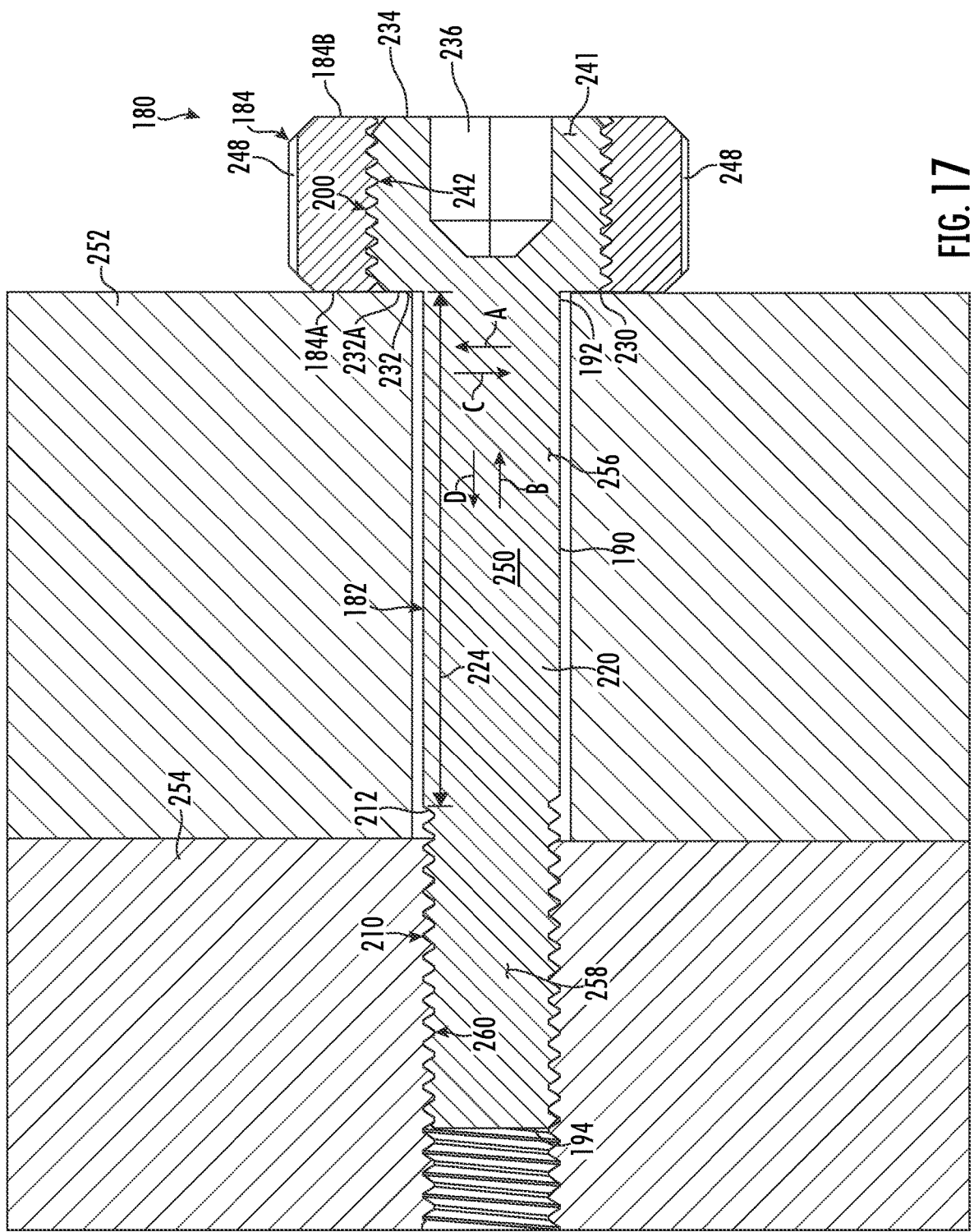
FIG. 17 is a view corresponding to FIG. 16 illustrating the fastener in use.

The assembled fastener 180 in FIGS. 14-16 is useful in forming bolted joint 250 in FIG. 17. FIG. 17 illustrates two members 252 and 254 secured together by assembled fastener 180. Members 252 and 254, metal plates in this example, have registered through bores 256 and 258, respectively. Bore 258 of member 254 is tapped with internal thread 260 and is exemplary of a tapped or internally threaded bore 258. Thread 130 corresponds to external thread 80, enabling it to thread conventionally on external thread 80.

A user forms bolted joint 250 with fastener 180 in FIG. 17 to secure members 252 and 254 together by inserting bolt 190 distal end 194 first into and through bore 256 to bore 258. He threads internal thread 260 on external thread 210 to advance bolt 182 in the direction of arrow D by rotating bolt 182 in the direction of arrow A until radial bearing surface 232A of underside 232 of head 230 and inner side 184A of nut 184 initially tighten against member 252. Bolt length 224 extends through bore 256 of member 252 to external thread 210 threaded to internally threaded bore 258. He alternately rotates nut 184 and bolt 182 in the direction of arrow A while holding the other one stationary. This alternately tightens outer side 184B of nut 54 and radial bearing surface 232A of underside 232 of head 230 against member 252 until the desired tension is achieved, clamping member 252 between member 254 and both inner side 184A of nut 54 and radial bearing surface 232A of head 232. Since rotation of bolt 182 in the direction of arrow A urges bolt 52 in the direction of arrow D and rotation of nut 184 relative to bolt 182 in the same direction of arrow A urges nut 184 in the opposite direction of arrow B, nut 184 serves as a locknut counter-rotated relative to head 230 of bolt 184 aggressively disabling bolt 182 from loosening by rotating in the direction of arrow C. Radial bearing surface 232A of head 230 additionally serves to distribute the load of fastener 180 without the need for a washer, although one can use a separate washer between radial bearing surface 232A and member 252 if desired. Since external threads 200 and 210 and internal thread 242 are identically sized and have the same pitches, the threaded attachments are strong and resistant to stripping. Fastener 180 securing bolted joint 250 is surprisingly strong and aggressive and resistant to axial failure, shear failure, and loosening in response to vibrational and prevailing torsional forces. The user need only reverse this operation to release bolted joint 250 and withdraw fastener 180. Like fastener 50', the assembled fastener 180 in FIGS. 14-16 is also useful with a nut and washer to form an alternate embodiment of a fastener useful in forming a bolted joint. The skilled artisan will readily appreciate that handedness of the threads described in conjunction with fastener 180 can be reversed in alternate embodiments.

Figure 18:
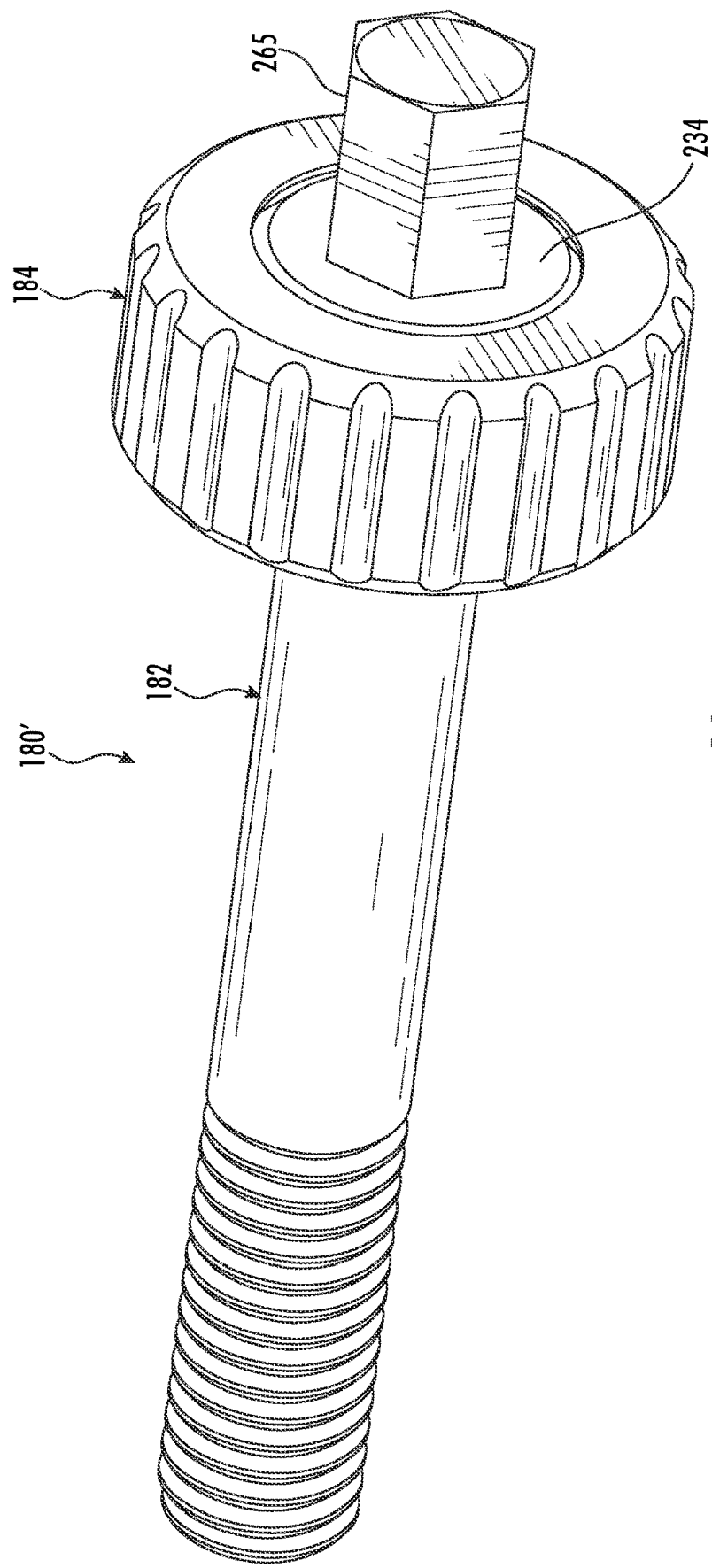
FIG. 18 is perspective view of still another embodiment of a fastener constructed and arranged according to the invention.

Keyway 236 in FIGS. 12 and 15-17 is multifaced and exemplary of an Allen keyway configured to accept an Allen key of a tool used to drive bolt 182 rotationally. In an alternate embodiment of a fastener 180' in FIG. 18 that, in common with fastener 180, shares bolt 182 and nut 184, bolt 182 is configured with a key 265 for bolt-turn purposes. Key 265 is multifaced and exemplary of a standard Allen key configured to accept a standard Allen keyway of a tool used to drive bolt 182 rotationally. In FIG. 18, key 265 for bolt-turn purposes extends outwardly from head 230 centrally from outer side 234.

III

Figure 19:
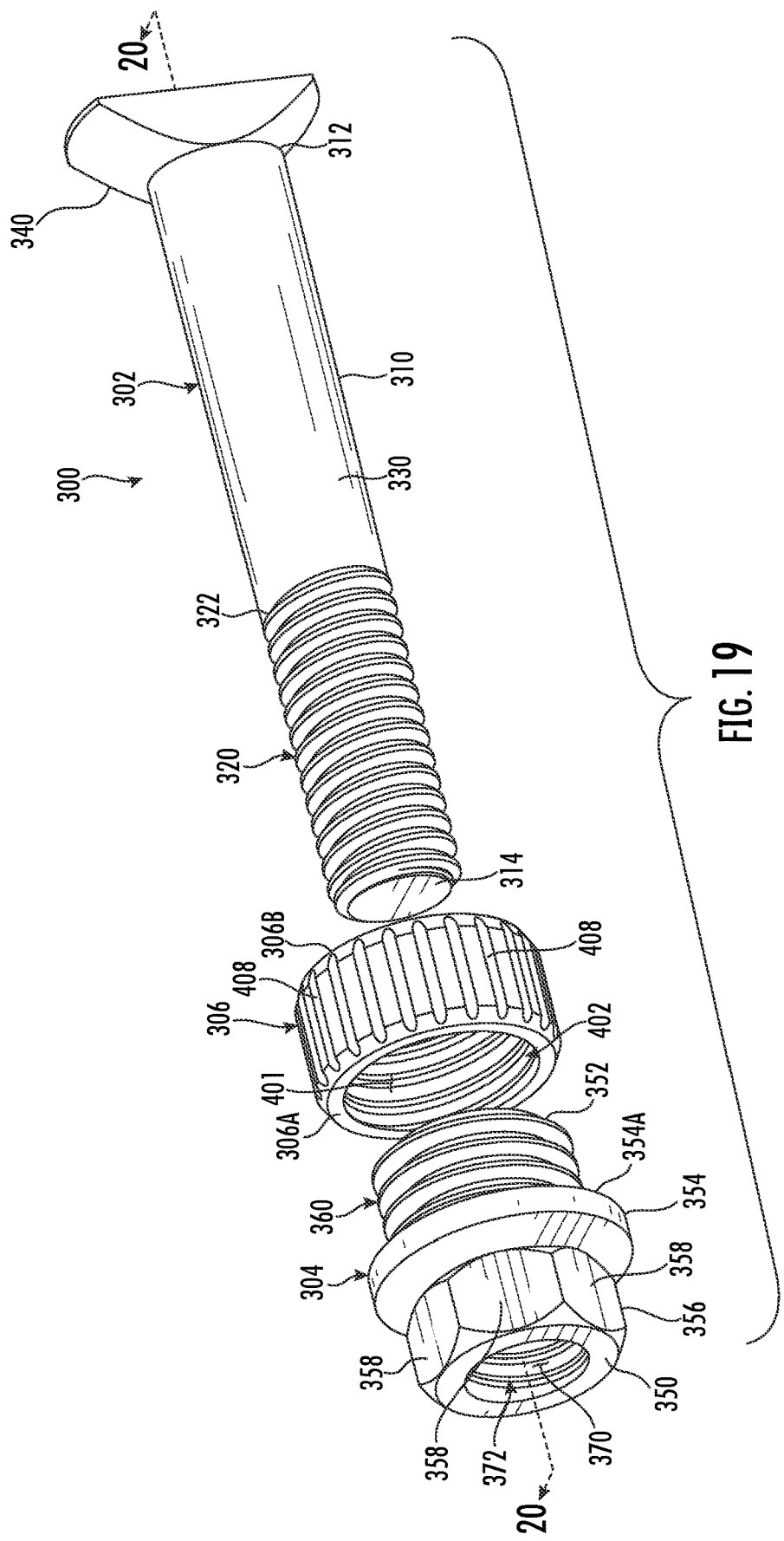
FIG. 19 is a perspective view of yet still another embodiment of a fastener constructed and arranged according to the invention, the fastener including a bolt, an anchor nut, and a locknut shown disassembled.
Figure 22:
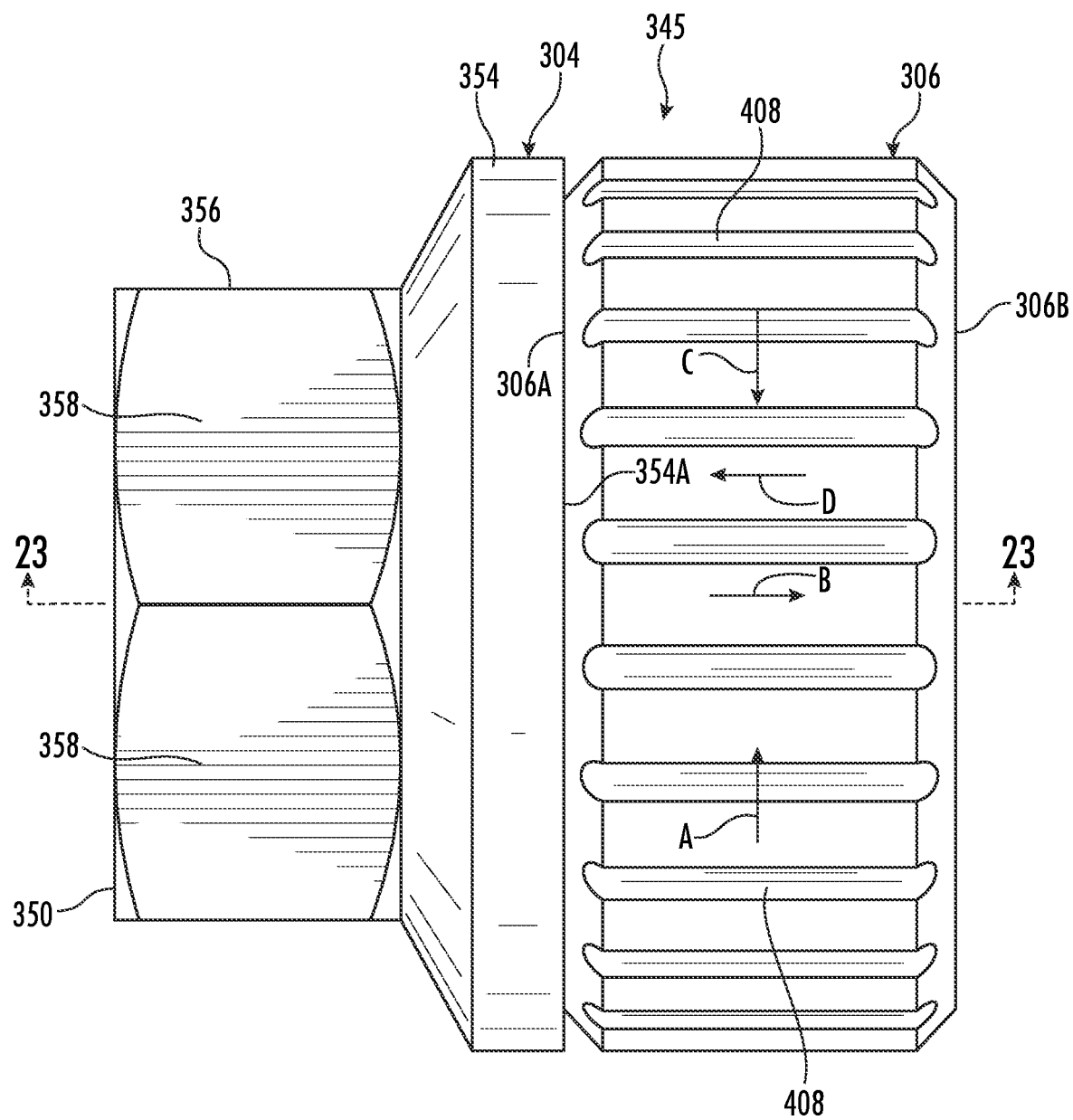
FIG. 22 is a side elevation view of the anchor nut and the locknut of FIG. 19 shown assembled to form an anchor nut assembly.

FIG. 19 illustrates yet another embodiment of a fastener 300 constructed and arranged according to the invention. Fastener 300 is useful in forming bolted joints and includes bolt 302, anchor nut 304, and locknut 306 configured to be repeatedly and quickly assembled and disassembled. Anchor nut 304 and locknut 306 are configured to be repeatedly assembled in FIGS. 22 and 23 to form an anchor nut assembly 345 and disassembled in FIG. 19 and independently from bolt 302. All diameters referenced throughout this specification related to fastener 300 are constant.

Figure 20:
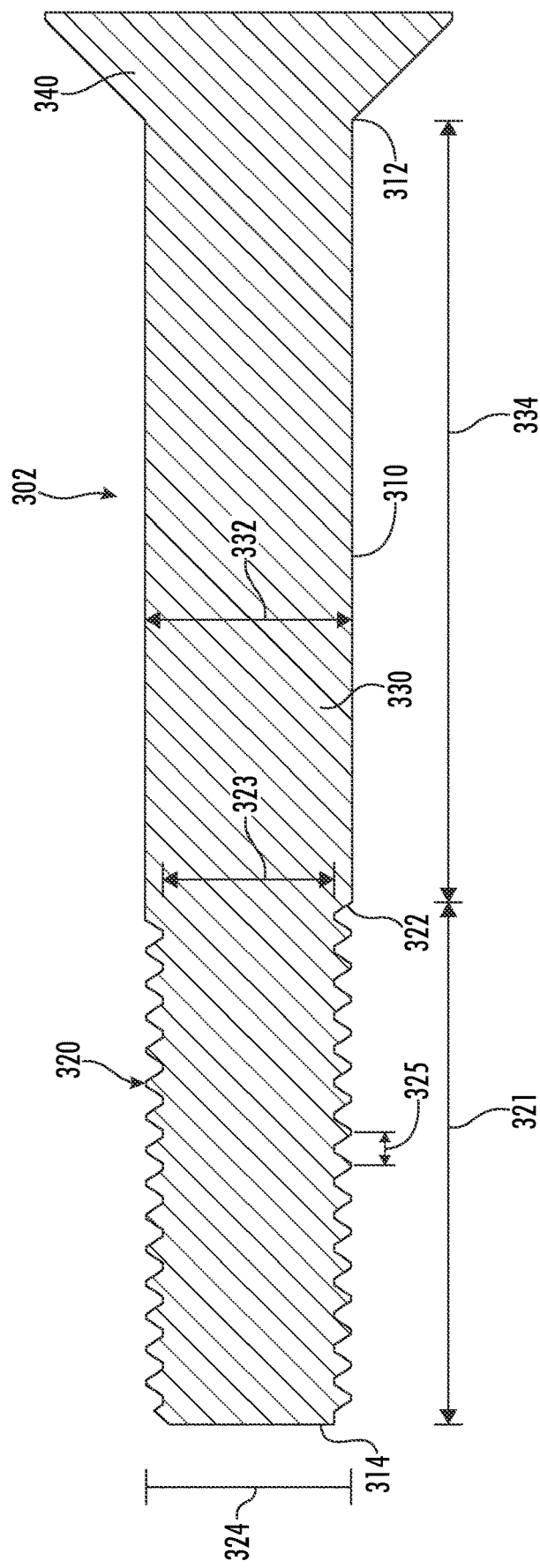
FIG. 20 is a central longitudinal section view of the bolt along line 20-20 of FIG. 19.

In FIGS. 19 and 20, bolt 302 includes longitudinally straight cylindrical shank 310 extending from proximal end 312 configured with enlarged lug or head 340 to distal end 314, external thread 320 and unthreaded body 330, including a diameter 332 in FIG. 20. Shank 60 extends outwardly to distal end 314 from proximal end 312 affixed centrally to head 240 configured to be anchored in a counterbore. External thread 320 twists in a right-hand direction and is exemplary of a standard right-handed external thread. In FIG. 20, external thread 320 includes thread length 321 extending from distal end 314 to runout 322 on a distal side of body 330, minor diameter 323, major diameter 324, and pitch 325, the distance between adjacent peaks or crests of the thread. Minor diameter 323 occurs at the roots of external thread 320. Major diameter 324 occurs at the crests of external thread 320. Thread length 321 of external thread 320 is less than grip length 334 of body 330 extending from head 340 to runout 322. Grip length 334, the length of the unthreaded portion of shank 310, namely, body 330, is the free length of bolt 302 that is stretched under tension.

Figure 21:
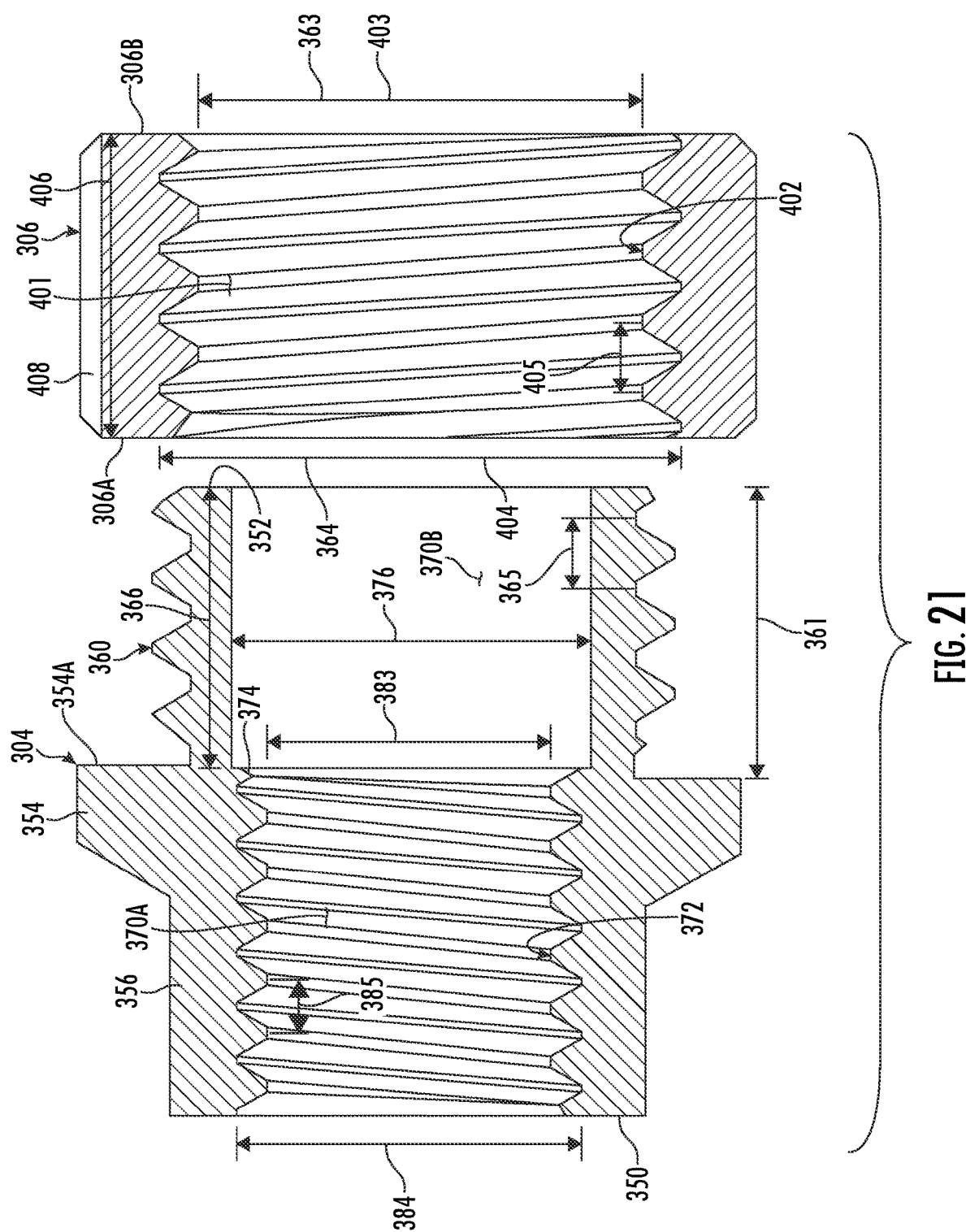
FIG. 21 is a central longitudinal section of the anchor nut and the locknut along line 20-20 of FIG. 19

In FIGS. 19 and 21, anchor nut 304 is an annular block or body including open inner end 350, open outer end 352, flange 354, head 356, external thread 360, and hole 370 configured with internal thread 372. Hole 370 extends through anchor nut 304 from open inner end 350 to open outer end 352. Head 356 has wrench flats 358, six in this example, for nut-turn purposes, and extends from open inner end 350 to the inner or proximal side of flange 354. Flange 354 extends from its inner side at head 356 to its outer or distal side, including radial bearing surface 354A. Radial bearing surface 354A faces external thread 360. External thread 360 extends between radial bearing surface 354A and outer end 352, twists in a left-hand direction opposite to external thread 320 of bolt 302, and is exemplary of a standard left-handed external thread. Head 356 and flange 354 together form an integrated flanged head of anchor nut 304.

In FIG. 21, left-handed external thread 360 includes thread length 361 extending along the length of anchor nut 304 between radial bearing surface 354A and outer end 352, minor diameter 363, major diameter 364, and pitch 365, the distance between adjacent peaks or crests of the thread. Minor diameter 363 occurs at the roots of external thread 360, and major diameter 364 occurs at the crests of external thread 360. External threads 320 and 360 twist in opposite directions, as described. Accordingly, external threads 320 and 360 are counter-threads configured to threadedly receive counter-rotating internally-threaded elements.

Hole 370 extending through anchor nut 304 from open inner end 350 to open outer end 352 in FIG. 21 has an internally threaded part 370A and coaxial unthreaded part 370B. Internally threaded part 370A includes internal thread 372 extending from open inner end 50 to runout 374 at an intermediate location of hole 370 between open inner end 350 and open outer end 352. Unthreaded part extends from runout 374 to open outer end 352. Unthreaded part 370B has internal diameter 376 greater than major diameter 324 of external thread 320 and diameter 332 of body 330 in FIG. 20.

In FIG. 21, internal thread 372 runs along the inside of anchor nut 304 between open inner end 350 and runout 374 and twists in the same right-hand direction as external thread 320 of bolt 302 opposite to the left-hand direction of external thread 360. Internal thread 372 includes minor diameter 383, major diameter 384, and pitch 385, the distance between adjacent peaks or crests of the thread. Minor diameter 383 occurs at the crests of internal thread 372, and major diameter 384 occurs at the roots of internal thread 372. Pitches 325, 365, and 385 are identical. Minor and major diameters 383 and 384 of internal thread 372 correspond to the respective minor and major diameters 323 and 324 of external thread 320. External thread 320 and 360 and internal thread 372 are the same size and have identical pitches.

Since diameter 376 of unthreaded part 370B of hole 370 of anchor nut 304 is greater than major diameter 324 of external thread 320, unthreaded part 370B of hole 370 is configured to receive therethrough in a direction from open outer end 352 distal end 324 of shank 310 and pass over external thread 320 until external thread 320 at proximal end 314 encounters runout 374. Since pitch 385 of internal thread 372 and pitch 325 of external thread 320 are the same, minor and major diameters 383 and 384 of internal thread 372 correspond to the respective minor and major diameters 323 and 324 of external thread 320, internal thread 372 twists in the same right-hand direction as external thread 320, and internal and external threads 372 and 320 are correspondingly sized, internal thread 372 corresponds to and is configured to thread rotationally over and on external thread 320 from runout 374 in FIG. 27 and off external thread 320 from runout 374. Accordingly, internal thread 372 corresponds to and is configured to thread over and on external thread 320.

In FIGS. 19 and 21, locknut 306 and is an annular block configured with a threaded hole 401, including internal thread 402. Threaded hole 401 extends through locknut 306 from an inner or first side 306A of locknut 306 to an outer or second side 306B of locknut 306. Inner and outer sides 306A and 306B of locknut 306 are radial bearing surfaces. Nut locknut 306 has a thickness 406 from inner side 306A to outer side 306B. In FIG. 21, internal thread 402 runs along the inside of locknut 306 between the opposed inner and outer sides 306A and 306B and twists in the same left-hand direction as external thread 360 opposite to the right-hand hand direction of external thread 320 of bolt 302 and internal thread 372 of anchor nut 304. Internal thread 402 includes minor diameter 403, major diameter 404, and pitch 405, the distance between adjacent peaks or crests of the thread. Minor diameter 403 occurs at the crests of internal thread 402, and major diameter 404 occurs at the roots of internal thread 402. Pitches 325, 365, 385, and 405 are identical. Minor and major diameters 403 and 404 of internal thread 402 correspond to the respective minor and major diameters 363 and 364 of external thread 360. External threads 320 and 360 and internal threads 372 and 402 are the same size and have identical pitches. In FIGS. 19, 22, and 24-26, locknut 306 has parallel and circumferentially spaced-apart wrench grooves 408 for nut-turn purposes.

Figure 23:
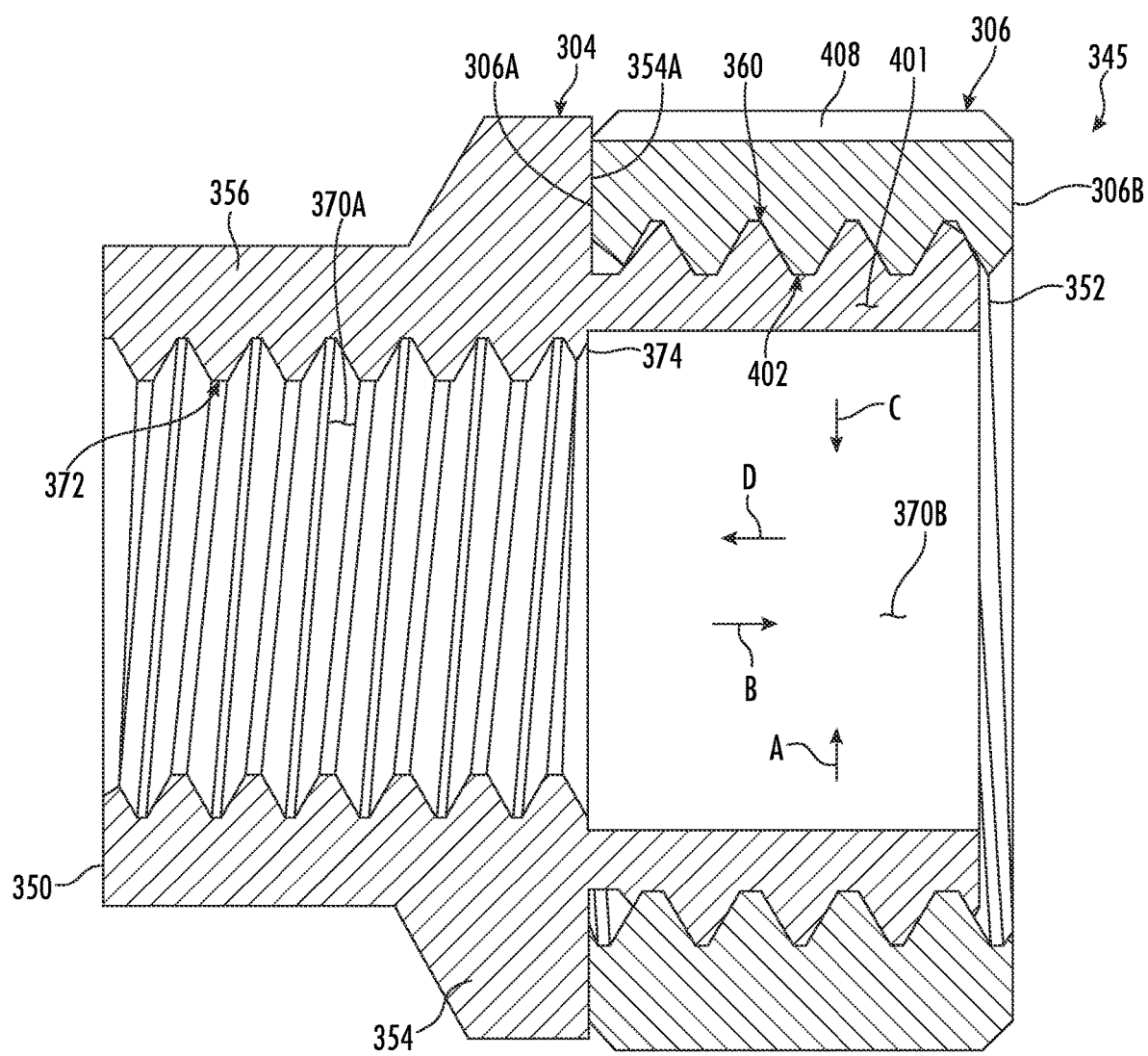
FIG. 23 is a central longitudinal section view along line 23-23 of FIG. 22.
Figure 24:
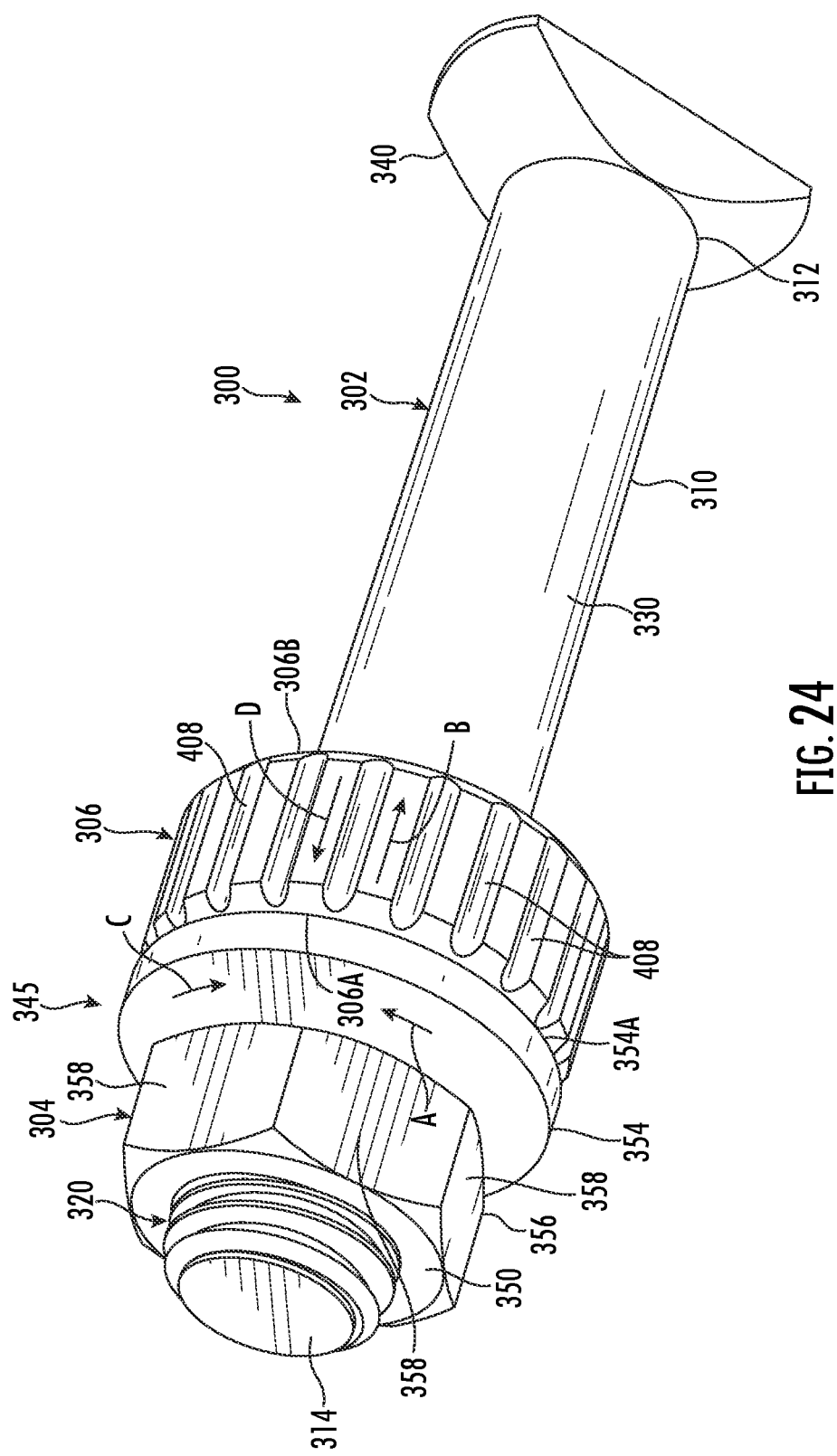
FIGS. 24 and 25 are perspective views of the fastener of FIG. 19 showing the bolt, the anchor nut, and the locknut assembled.
Figure 25:
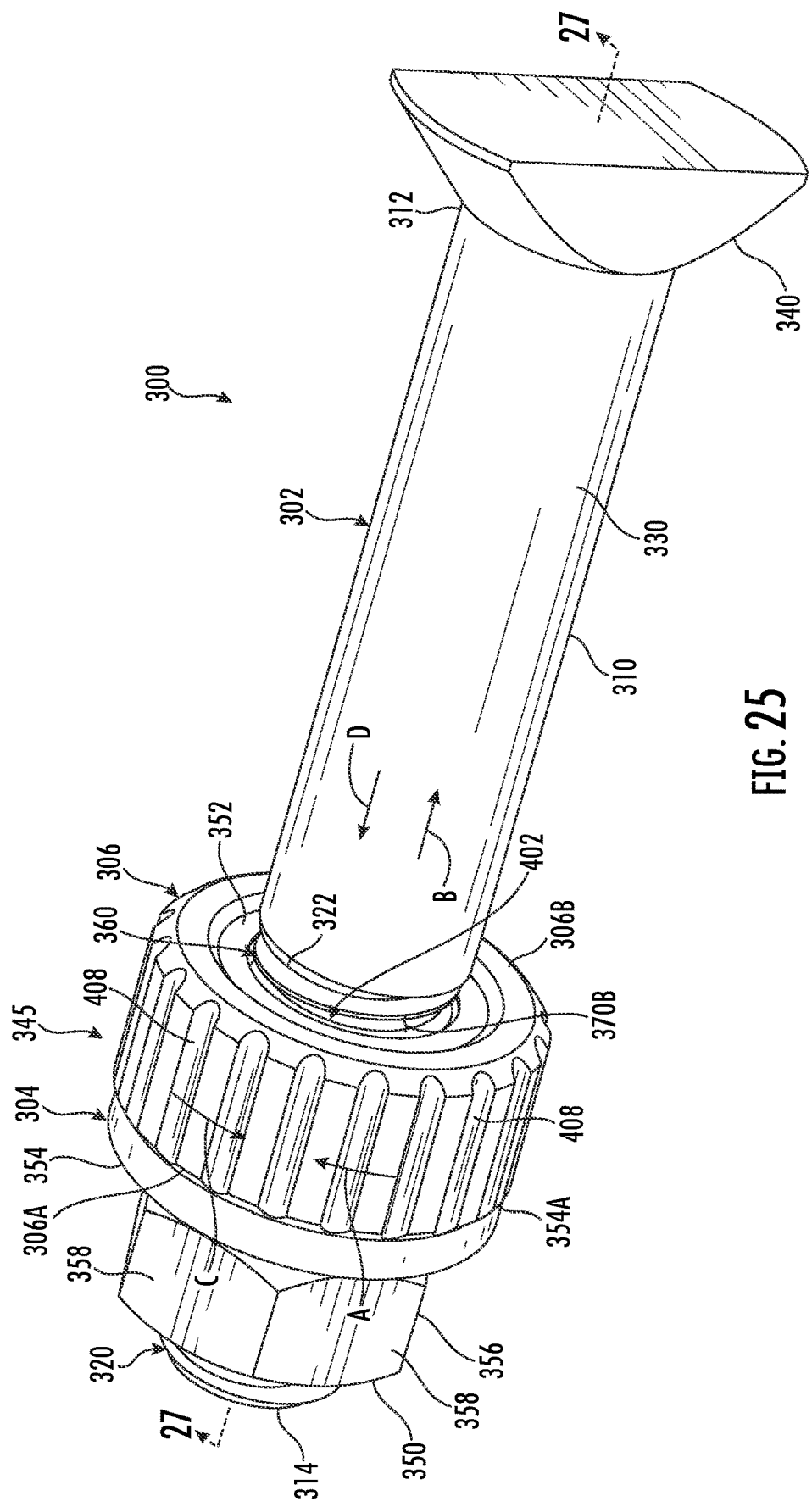
Figure 26:
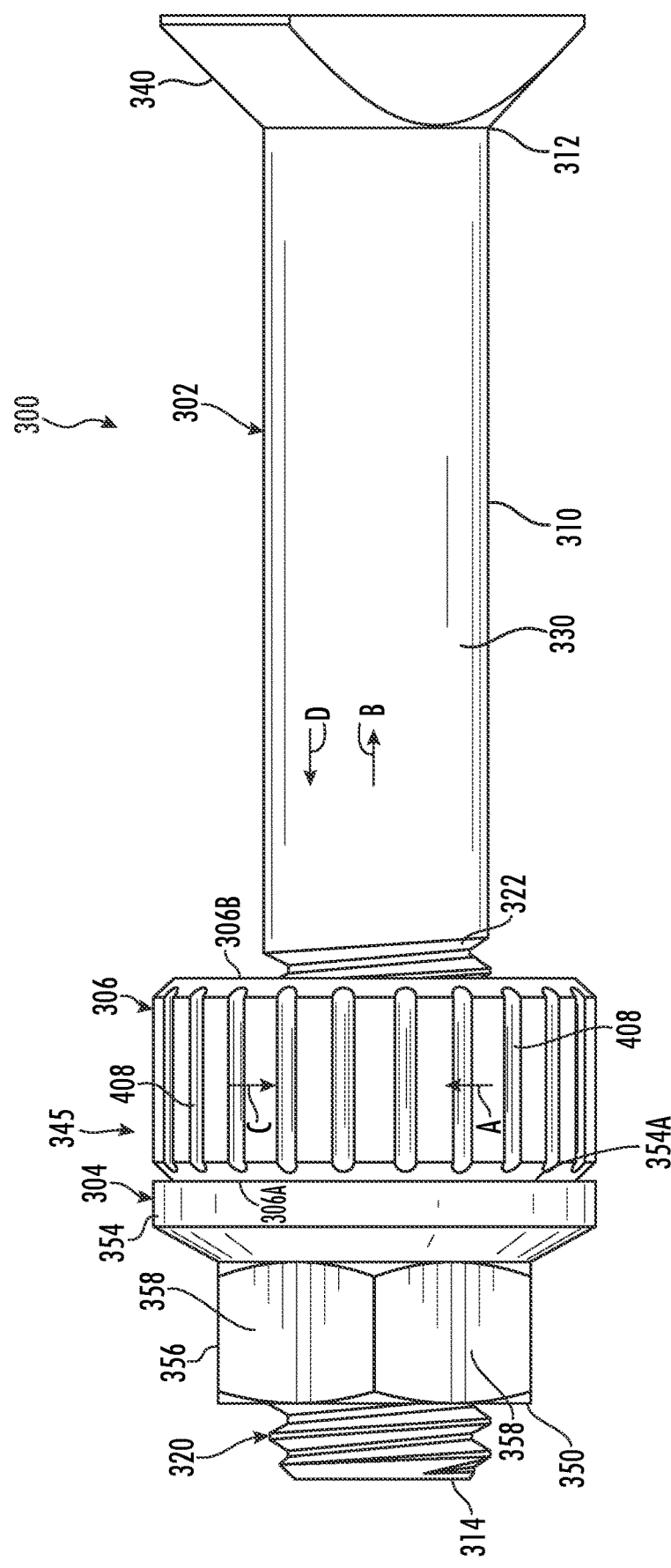
FIG. 26 is a side elevation view of the embodiment of FIGS. 24 and 25.

Since pitch 405 of internal thread 402 and pitch 365 of external thread 360 are the same, minor and major diameters 403 and 404 of internal thread 402 correspond to the respective minor and major diameters 363 and 364 of external thread 360, internal thread 402 twists in the same left-hand direction as external thread 360, and internal and external threads 402 and 360 are correspondingly sized, internal thread 402 corresponds to and is configured to thread rotationally over and on external thread 360 from open outer end 352 of anchor nut 304 in FIG. 23 and off external thread 360 from open outer end 352. Accordingly, internal thread 402 corresponds to and is configured to thread over and on external thread 360 for assembling anchor nut 304 and locknut 306 to form anchor nut assembly 345 in FIGS. 22 and 23. Internal threads 372 and 402 twist in opposite directions, as described, internal thread 372 in the same direction as external thread 320 and internal thread 402 in the same direction as external thread 360. Accordingly, internal threads 372 and 402 are counter-threads configured to threadedly receive counter-rotating externally-threaded elements.

In FIG. 23, a user assembles anchor nut assembly 345 by threading internal thread 402 over and on external thread 360. The user threads internal thread 402 over and on external thread 360 by inserting open outer end 352 of anchor nut 304 into threaded hole 401 from inner side 306A and rotating locknut 306 in the direction of arrow C. This advances locknut 306 in the direction of arrow D until inner side 306A of locknut 306 is tightened directly against radial bearing surface 354A of flange 354. Locknut 306 is suitably sized to extend entirely over external thread 360 from inner side 306A of locknut 306 tightened directly against radial bearing surface 354A, shown also in FIG. 22, to outer side 306B of locknut 306 outboard of open outer end 352 in the assembly of anchor nut 304 and locknut 306 in FIG. 23, when locknut 306 is tightened directly against radial bearing surface 354A of flange 304 by rotating it in the direction of arrow C tightly against radial bearing surface 354A of flange 304. Accordingly, the dimension of locknut 306 from inner side 306A to outer side 306B, the thickness 406 of locknut 306 from inner side 306A to outer side 306B in FIG. 21, is greater than the dimension of anchor nut 304 from radial bearing surface 354A to open outer end 352, the thickness 366 of anchor nut 304 from radial bearing surface 354A to open outer end 352 in FIG. 21. Rotating locknut 306 in the direction of arrow A opposite to the direction of arrow C withdraws locknut 306 from radial bearing surface 354A in the direction of arrow B. Accordingly, a user need only reverse the operation threading locknut 306 on anchor nut 304 to separate locknut 306 from anchor nut 304. Anchor nut 304 and locknut 306 may be repeatedly assembled and disassembled as needed.

Figure 27:
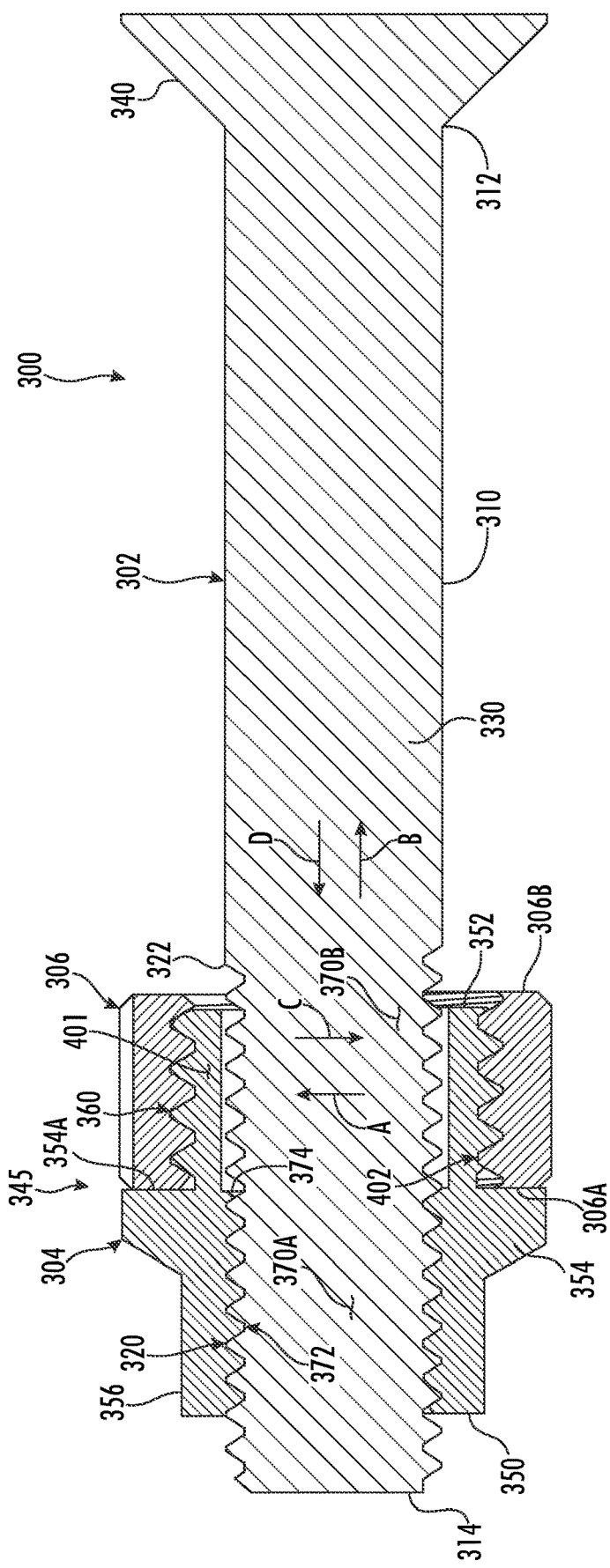
FIG. 27 is a section view along line 27-27 of FIG. 26.

The assembly of bolt 302 and anchor nut assembly 345 forms fastener 300 in FIGS. 24-27. Referring to FIGS. 24-27 in relevant part, a user assembles anchor nut assembly 345 and bolt 302 by inserting bolt 302 distal end 314 first into and through unthreaded part 370A of bore 370 through open outer end 352 until external thread 320 at distal end 314 encounters runout 374. He threads internal thread 372 on external thread 320 and advances anchor nut assembly 345 in the direction of arrow D by rotating bolt 302 in the direction of arrow A until internal thread 372 is threaded completely on external thread 320 in FIG. 27. In FIG. 27, locknut 306 is between radial bearing surface 354A and head 340, inner side 306A is tightened directly against radial bearing surface 354A, and external thread 320 extends through unthreaded part 370B of hole 370 from open outer end 352 to runout 374 and through threaded part 370A of hole 370 from runout 374 to open inner end 350 and beyond open inner end 350 to distal end 314 without interference from locknut 306 threaded on external thread 360 of anchor nut 304. External threads 320 and 360 twist in opposite right and left directions, as described. Accordingly, anchor nut 304 threaded on bolt 302 and locknut 306 threaded on anchor nut 306 are counter-rotated. Rotating anchor nut 304 equipped with its attached locknut 306 in the direction of arrow A opposite to the direction of arrow C withdraws anchor nut assembly 345 from external thread 320 of bolt 302 in the direction of arrow D. Accordingly, a user need only reverse the operation threading anchor nut 304 on bolt 302 to separate anchor nut assembly 345 from bolt 302. Bolt 302 and anchor nut assembly 345 may be repeatedly assembled and disassembled as needed.

Figure 28:
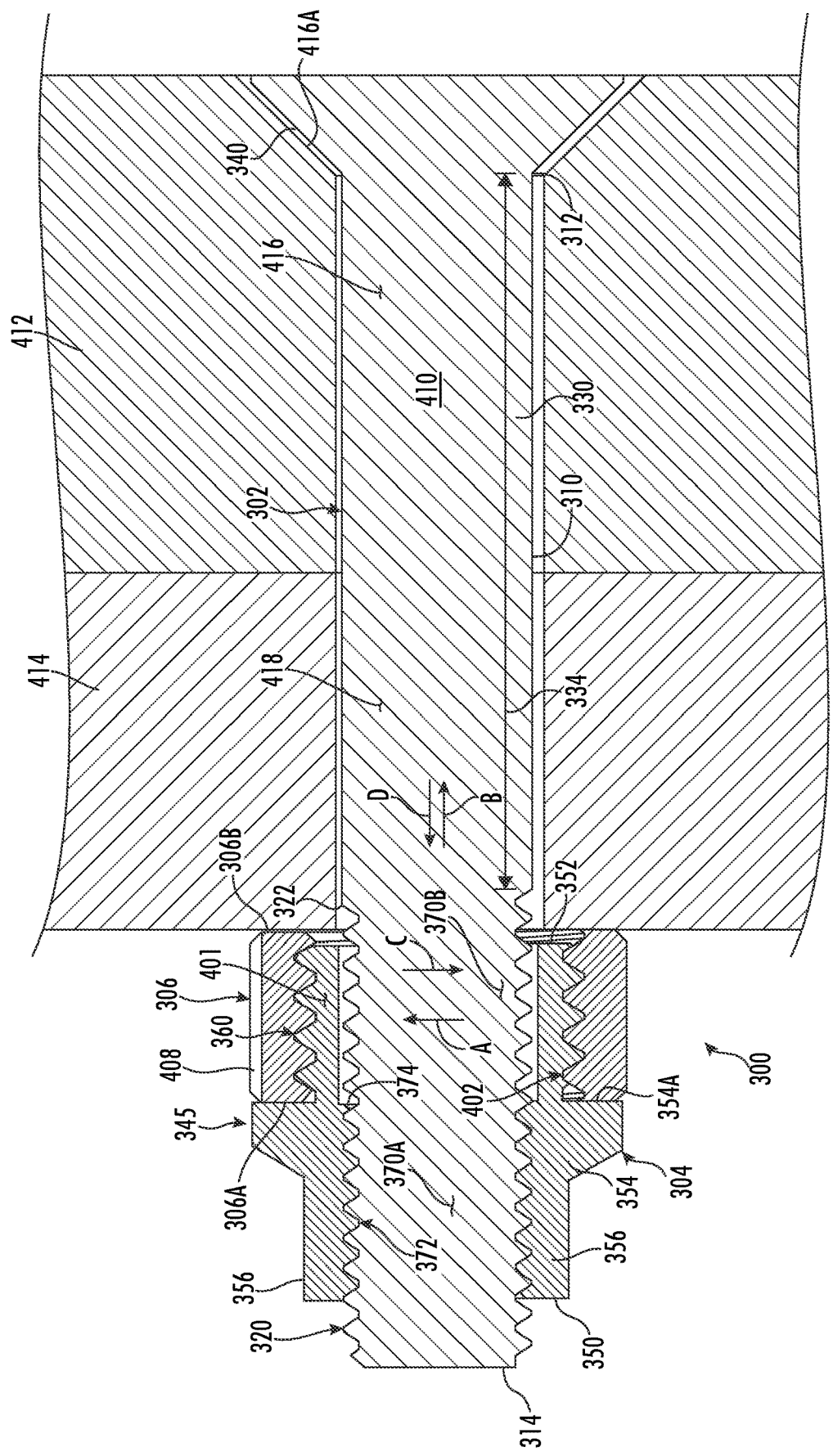
FIG. 28 is a view corresponding to FIG. 27 illustrating the fastener in use.

Fastener 300 is useful in forming bolted joint 410 in FIG. 28, including members 412 and 414 secured together by fastener 300, the assembly of bolt 302, anchor nut 304, and locknut 306. Members 412 and 414, metal plates in this example, have registered through bores 416 and 418, respectively. A user forms bolted joint 410 to secure members 412 and 414 together by inserting bolt 302 free of anchor nut assembly 345 distal end 314 first into and through bore 416 to bore 418 to seat head 340 in bore's 416 counterbore 416A on one side of the bolted joint 410 and extend external thread 320 outwardly from bore 418 to distal end 314 on the opposite side of bolted joint 410. Head 340 and counterbore 416A are correspondingly shaped. The user installs anchor nut assembly 345 on bolt 302 to assemble fastener 300 by inserting bolt 310 distal end 314 first into and through unthreaded part 370A of bore 370 through open outer end 352 until external thread 320 at distal end 314 encounters runout 374. He threads internal thread 372 on external thread 320 by rotating anchor nut 304 equipped with its installed locknut 306 in the direction of arrow C. This advances anchor nut assembly 345 in the direction of arrow B until internal thread 372 is threaded completely on external thread 320 between distal end 324 and member 414 and outer side 306B of locknut 306 is tightened directly against member 414 initially clamping locknut 306 between radial bearing surface 354A of anchor nut 304 and member 414. Since the dimension of locknut 306 from inner side 306A to outer side 306B is greater than the dimension of anchor nut 304 from radial bearing surface 354A to open outer end 352, open outer end 352 is disabled from coming into direct contact against member 414. Bolt length 334 extends through bores 416 and 418 from head 340 in counterbore 416A to external thread 320, extending outwardly from bore 418 to anchor nut assembly 345 and distal end 314 outboard of open inner end 350. He alternately rotates anchor nut 304 and locknut 306 in the direction of arrow C. This alternately tightens inner side 306A of locknut 306 against radial bearing surface 354A and outer side 306B of locknut 306 against member 414 until the desired tension is achieved, tightly clamping members 412 and 414 between head 340 anchored in counterbore 416A on one side of bolted joint 410 and outer side 306B of locknut 306 on the opposite side of bolted joint 410 and tightly clamping locknut 306 between radial bearing surface 354A tightened directly against inner side 306A of locknut 306 and member 414 tightened directly against outer side 306B of locknut 306. Locknut 306 tightened directly against radial bearing surface 354A and member 414 serves its function as a locknut counter-rotated relative to external thread 320 of bolt 302 and internal thread 372 of anchor nut 304 aggressively disabling bolt 302 from loosening by rotating in the direction of arrow C. Since external threads 320 and 360 and internal threads 372 and 402 are identically sized and have the same pitches, the threaded attachments are strong and resistant to stripping. Fastener 300 securing bolted joint 410 is surprisingly strong and aggressive and resistant to axial failure, shear failure, and loosening in response to vibrational and prevailing torsional forces. The user need only reverse this operation to release bolted joint 410 and withdraw fastener 300. The skilled artisan will readily appreciate that handedness of the threads described in conjunction with fastener 300 can be reversed in alternate embodiments.

The thickness 406 of locknut 306 from inner side 306A to outer side 306B in FIG. 21 is greater than the thickness 366 of anchor nut 304 from radial bearing surface 354A to open outer end 352 in FIG. 21. This disables open outer end 352 from coming into direct contact against member 414. In an alternate embodiment, the thickness 406 of locknut 306 from inner side 306A to outer side 306B in FIG. 21 can be the same or slightly less than the thickness 366 of anchor nut 304 from radial bearing surface 354A to open outer end 352 in FIG. 21 to enable open outer end 352 to come into direct contact against member 414. In yet another embodiment, anchor nut 304 can be internally threaded by thread 372 from open inner end 350 to open outer end 352.

IV

Figure 29:
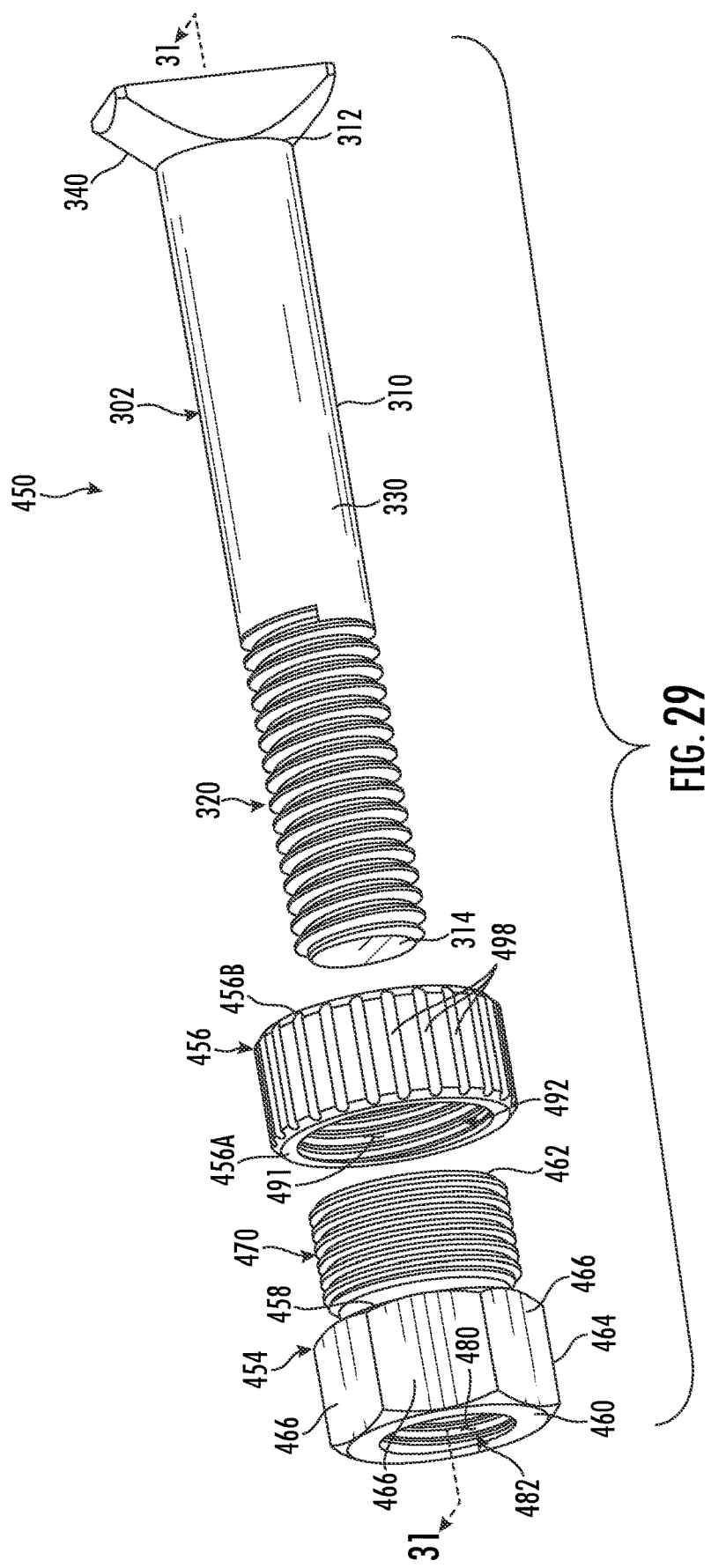
FIG. 29 is a perspective view of still another embodiment of a fastener constructed and arranged according to the invention and shown disassembled, the fastener including a bolt, an anchor nut, and a locknut.

FIG. 29 illustrates still another embodiment of a fastener 450 constructed and arranged according to the invention. Fastener 450 is useful in forming bolted joints and includes the previously-described bolt 302 appropriately marked as needed with its corresponding reference numerals for reference purposes, anchor nut 454, and locknut 456 configured to be repeatedly and quickly assembled and disassembled. Anchor nut 454 and locknut 456 are configured to be repeatedly assembled in FIG. 30 to form an anchor nut assembly 458 and disassembled in FIG. 29 independently from bolt 452. All diameters referenced throughout this specification related to fastener 450 are constant.

Figure 30:
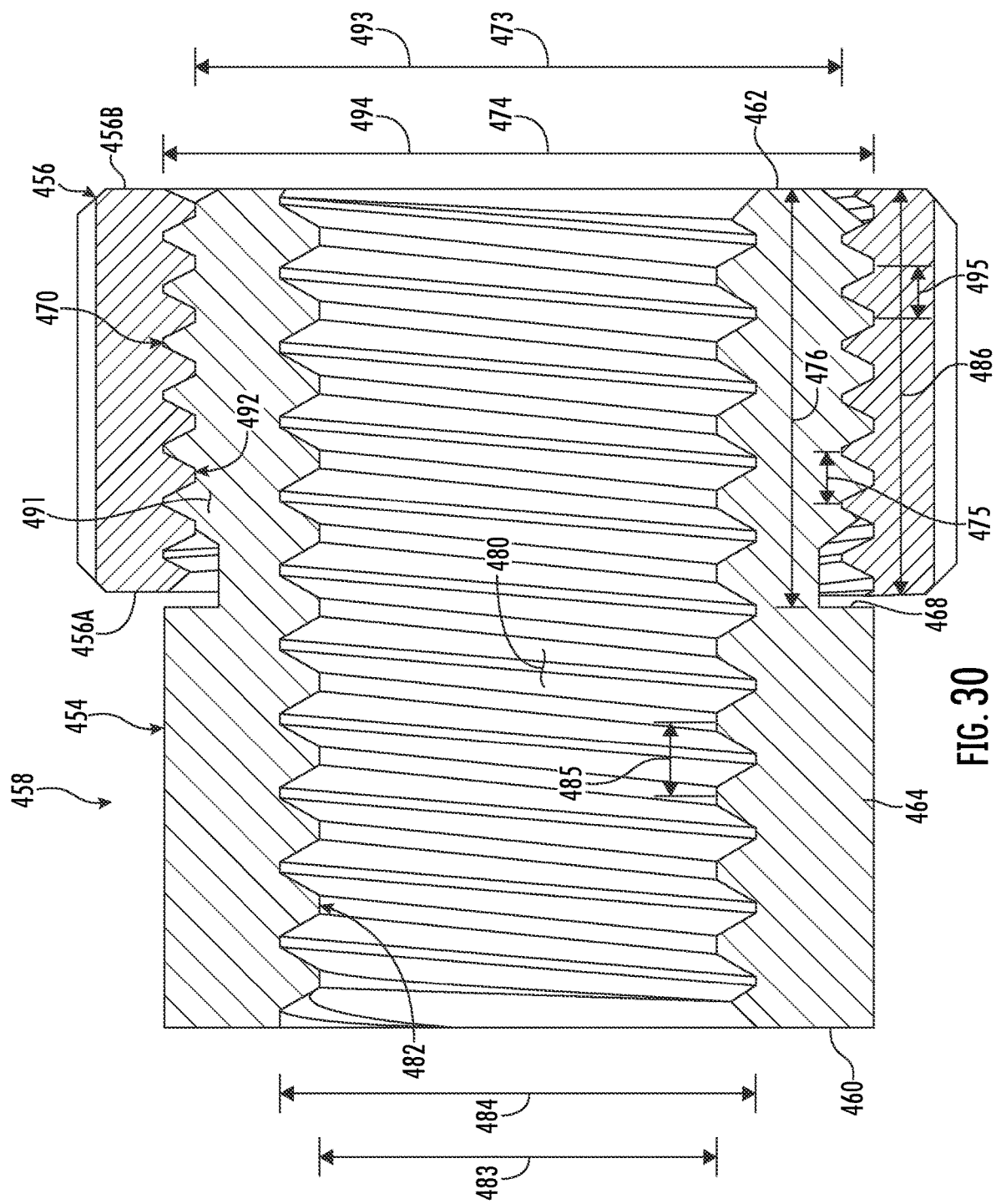
FIG. 30 is a central longitudinal section view of the anchor nut and the locknut of FIG. 29 shown assembled to form an anchor nut assembly.

In FIGS. 29 and 30, anchor nut 454 is an annular block or body including open inner end 460, open outer end 462, head 464, external thread 470, and hole 480 configured with internal thread 482. Hole 480 extends through anchor nut 454 from open inner end 460 to open outer end 462. Head 464 has wrench flats 466, six in this example, for nut-turn purposes, and extends from open inner end 460 to radial bearing surface 458 of head 464. Radial bearing surface 458 faces external thread 470. External thread 470 extends between radial bearing surface 458 and outer end 462, twists in a left-hand direction opposite to external thread 320 of bolt 302, and is exemplary of a standard left-handed external thread.

In FIG. 30, left-handed external thread 470 extends between radial bearing surface 458 and outer end 462 and includes minor diameter 473, major diameter 474, and pitch 475, the distance between adjacent peaks or crests of the thread. Minor diameter 473 occurs at the roots of external thread 470, and major diameter 474 occurs at the crests of external thread 470. External threads 320 and 470 twist in opposite directions, as described. Accordingly, external threads 320 and 470 are counter-threads configured to threadedly receive counter-rotating internally-threaded elements.

Figure 31:
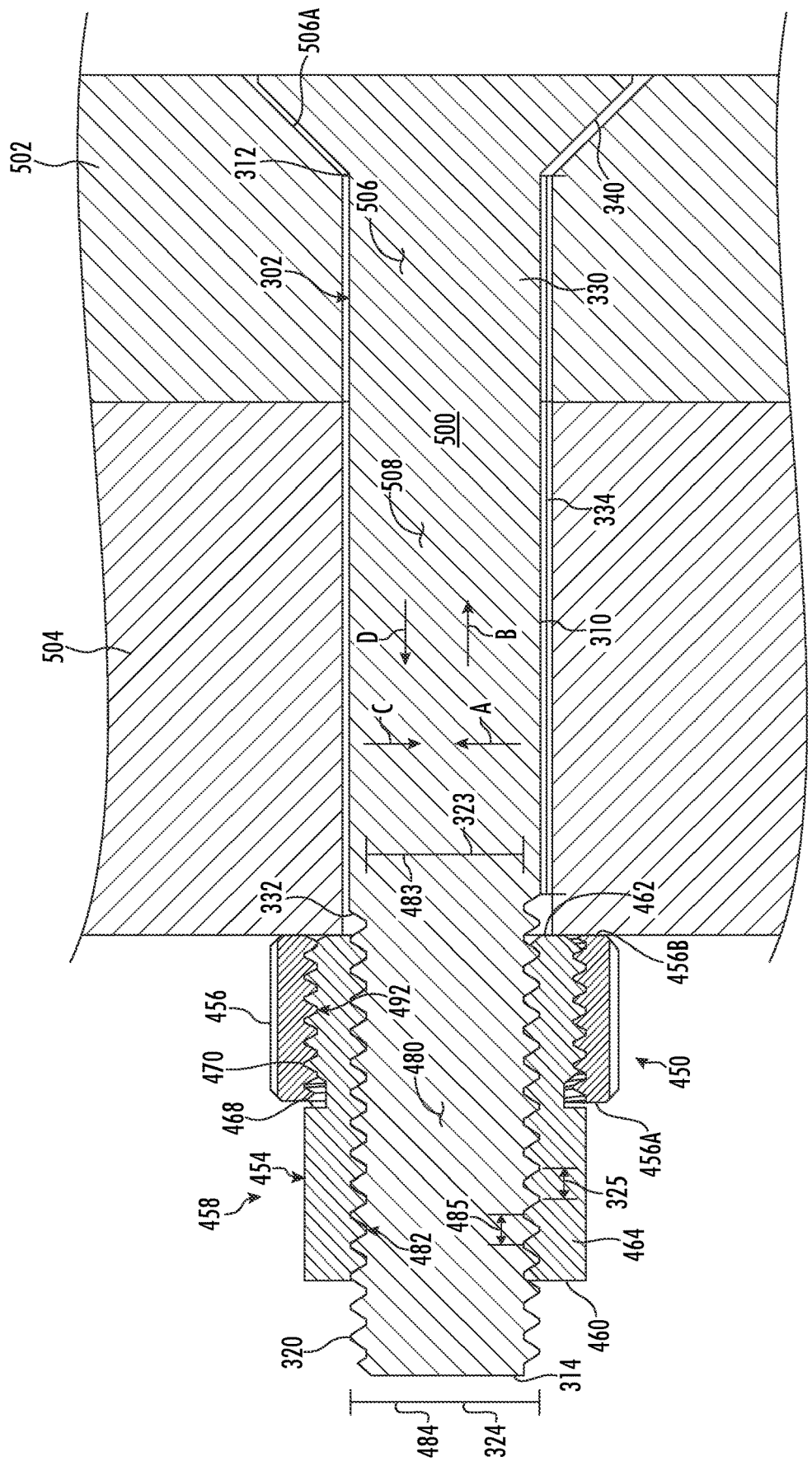
FIG. 31 is a central longitudinal section view of fastener of FIG. 29 showing the bolt, the anchor nut, and the locknut assembled and in use.

Hole 480 extending through anchor nut 454 from open inner end 460 to open outer end 462 in FIG. 21 is internally threaded by internal thread 482 from open inner end 460 to open outer end 462. Internal thread 482 runs along the inside of anchor nut 454 from open inner end 460 to open outer end 462 and twists in the same right-hand direction as external thread 320 of bolt 302 opposite to the left-hand direction of external thread 470. Internal thread 482 includes minor diameter 483, major diameter 484, and pitch 485, the distance between adjacent peaks or crests of the thread. Minor diameter 483 occurs at the crests of internal thread 482, and major diameter 484 occurs at the roots of internal thread 482. Pitch 485 of internal thread 482 and pitch 325 of external thread 320 of bolt 302 in FIG. 31 are identical. Minor and major diameters 483 and 484 of internal thread 482 correspond to the respective minor and major diameters 323 and 324 of external thread 320 in FIG. 31. Internal thread 482 and external thread 320 correspond and are the same size and have identical pitches.

Since pitch 485 of internal thread 482 and pitch 325 of external thread 320 are the same, minor and major diameters 483 and 484 of internal thread 482 correspond to the respective minor and major diameters 323 and 324 of external thread 320, internal thread 482 twists in the same right-hand direction as external thread 320, and internal and external threads 482 and 320 are correspondingly sized, internal thread 482 corresponds to and is configured to thread rotationally over and on external thread 320 from open outer end 462 in FIGS. 30 and 31 and off external thread 320 from open outer end 462. Accordingly, internal thread 482 corresponds to and is configured to thread over and on external thread 320.

In FIGS. 29 and 30, locknut 456 and is an annular block configured with a threaded hole 491, including internal thread 492. Threaded hole 491 extends through locknut 456 from an inner side 456A of locknut 306 to an outer side 456B of locknut 306 in FIG. 30. Inner and outer sides 456A and 456B of locknut 456 are radial bearing surfaces. Locknut 456 has a thickness 486 from inner side 456A to outer side 456B. In FIG. 30, internal thread 492 runs along the inside of locknut 456 between the opposed inner and outer sides 456A and 456B and twists in the same left-hand direction as external thread 470 opposite to the right-hand hand direction of external thread 320 of bolt 302 and internal thread 482 of anchor nut 454. Internal thread 492 includes minor diameter 493, major diameter 494, and pitch 495, the distance between adjacent peaks or crests of the thread. Minor diameter 493 occurs at the crests of internal thread 492, and major diameter 494 occurs at the roots of internal thread 492. Pitches 475 and 495 are identical and somewhat smaller than pitches 485 and 325. Minor and major diameters 493 and 494 of internal thread 492 correspond to the respective minor and major diameters 473 and 474 of external thread 470. External thread 470 and internal thread 492 are the same size and have identical pitches. In FIG. 29, locknut 456 has parallel and circumferentially spaced-apart wrench grooves 498 for nut-turn purposes.

Since pitch 495 of internal thread 492 and pitch 475 of external thread 470 are the same, minor and major diameters 493 and 494 of internal thread 492 correspond to the respective minor and major diameters 473 and 474 of external thread 470, internal thread 492 twists in the same left-hand direction as external thread 470, and internal and external threads 492 and 470 are correspondingly sized, internal thread 492 corresponds to and is configured to thread rotationally over and on external thread 470 from open outer end 462 of anchor nut 454 in FIGS. 30 and 31 and off external thread 470 from open outer end 462. Accordingly, internal thread 492 corresponds to and is configured to thread over and on external thread 470 for assembling anchor nut 454 and locknut 456 to form anchor nut assembly 458 in FIGS. 30 and 31. Internal threads 482 and 492 twist in opposite directions, as described, internal thread 482 in the same direction as external thread 320 of bolt 302 and internal thread 492 in the same direction as external thread 470. Accordingly, internal threads 482 and 492 are counter-threads configured to threadedly receive counter-rotating externally-threaded elements.

In FIG. 30, a user assembles anchor nut assembly 458 by threading internal thread 492 over and on external thread 470. The user threads internal thread 492 over and on external thread 470 by applying open outer end 462 of anchor nut 454 into threaded hole 491 from inner side 456A and rotating locknut 456 in the direction of arrow C. This advances locknut 456 in the direction of arrow D until inner side 456A of locknut 456 and radial bearing surface 468 of head 466 are juxtaposed. Locknut 456 is suitably sized to extend entirely over external thread 470 from inner side 456A of locknut 456 juxtaposed with radial bearing surface 468 to outer side 456B of locknut 456 at open outer end 462 in the assembly of anchor nut 454 and locknut 456 in FIG. 30, when locknut 456 is threaded on anchor nut 454. The dimension of locknut 456 from inner side 456A to outer side 456B, the thickness 486 of locknut 456 from inner side 456A to outer side 456B, is less than the dimension of anchor nut 454 from radial bearing surface 468 to open outer end 462, the thickness 476 of anchor nut 454 from radial bearing surface 468 to open outer end 462. Rotating locknut 456 in the direction of arrow A opposite to the direction of arrow C withdraws locknut 456 from radial bearing surface 468 and off anchor nut 454 in the direction of arrow B. Accordingly, a user need only reverse the operation threading locknut 456 on anchor nut 454 to separate locknut 456 from anchor nut 454. Anchor nut 454 and locknut 456 may be repeatedly assembled and disassembled as needed.

The assembly of bolt 302 and anchor nut assembly 458 forms fastener 450 in FIG. 31. A user assembles anchor nut assembly 458 and bolt 302 by inserting bolt 302 distal end 314 first into open outer end 462 until external thread 320 at distal end 314 encounters internal thread 482 at open outer end 462. He threads internal thread 482 on external thread 320 and advances anchor nut assembly 458 in the direction of arrow D by rotating bolt 302 in the direction of arrow A until internal thread 482 is threaded completely on external thread 320. Locknut 456 is between radial bearing surface 468 and head 340, inner side 456A and radial bearing surface 468 are juxtaposed, outer side 456B and open outer end 462 are juxtaposed, and external thread 320 extends through internally threaded hole 480 from open outer end 462 to open inner end 460 and beyond open inner end 460 to distal end 314 without interference from locknut 456 threaded on external thread 470 of anchor nut 454. External threads 320 and 470 twist in opposite right and left directions, as described. Accordingly, anchor nut 454 threaded on bolt 302 and locknut 456 threaded on anchor nut 454 are counter-rotated. Rotating anchor nut 454 equipped with its attached locknut 456 in the direction of arrow A opposite to the direction of arrow C withdraws anchor nut assembly 458 from external thread 320 of bolt 302 in the direction of arrow D. Accordingly, a user need only reverse the operation threading anchor nut assembly 458 on bolt 302 to separate anchor nut assembly 458 from bolt 302. Bolt 302 and anchor nut assembly 458 may be repeatedly assembled and disassembled as needed.

Fastener 450 is useful in forming bolted joint 500 in FIG. 31, including members 502 and 504 secured together by fastener 450, the assembly of bolt 302, anchor nut 454, and locknut 456. Members 502 and 504, metal plates in this example, have registered through bores 506 and 508, respectively. A user forms bolted joint 500 to secure members 502 and 504 together by inserting bolt 310 distal end 314 first into and through bore 506 to bore 508 to seat head 340 in bore's 506 counterbore 506A on one side of the bolted joint 500 and extend external thread 320 outwardly from bore 508 to distal end 314 on the opposite side of bolted joint 500. Head 340 and counterbore 506A are correspondingly shaped. The user installs anchor nut assembly 458 on bolt 302 to assemble fastener 450 by inserting bolt 310 distal end 314 first into open outer end 462 so external thread 320 at distal end 314 encounters internal thread 482. He threads internal thread 482 on external thread 320 by rotating anchor nut 454 equipped with its installed locknut 456 in the direction of arrow C. This advances anchor nut assembly 458 in the direction of arrow B until internal thread 482 is threaded completely on external thread 320 and outer side 456B of locknut 456 and open outer end 456 are is concurrently tightened directly against member 504. Since the dimension of locknut 456 from inner side 456A to outer side 456B is less than the dimension of anchor nut 454 from radial bearing surface 468 to open outer end 462, open outer end 462 is enabled to come into direct contact against member 414. Bolt length 334 extends through bores 506 and 508 from head 340 in counterbore 506A to external thread 320, extending outwardly from bore 508 to anchor nut assembly 458 and distal end 314. He alternately rotates anchor nut 454 and locknut 456 in the direction of arrow C. This alternately tightens outer side 456B of locknut 456 and open outer end 462 of anchor nut 454 against member 504 until the desired tension is achieved, clamping members 502 and 504 between head 340 anchored in counterbore 506A on one side of bolted joint 500 and outer side 456B of locknut 456 and open outer end 462 of anchor nut 454 concurrently tightened directly against member 504 on the opposite side of bolted joint 500. With both outer side 456B of locknut 456 and open outer end 462 of anchor nut 454 concurrently tightened directly against member 504, locknut 456 serves its function as a locknut counter-rotated relative to external thread 320 of bolt 302 and internal thread 372 of anchor nut 454 aggressively disabling bolt 302 from loosening by rotating in the direction of arrow C. Fastener 450 securing bolted joint 500 is surprisingly strong and aggressive and resistant to axial failure, shear failure, and loosening in response to vibrational and prevailing torsional forces. The user need only reverse this operation to release bolted joint 500 and withdraw fastener 450. The skilled artisan will readily appreciate that handedness of the threads described in conjunction with fastener 450 can be reversed in alternate embodiments.

The thickness 486 of locknut 456 from inner side 456A to outer side 456B is less than the thickness 476 of anchor nut 454 from radial bearing surface 468 to open outer end 462. In an alternate embodiment, the thickness 486 of locknut 456 from inner side 456A to outer side 456B can be the same as the thickness 476 of anchor nut 454 from radial bearing surface 468 to open outer end 462.

V

The person having ordinary skill in the art will readily appreciate that disclosed are exemplary bolts, bolt and nut fasteners, and bolted joints formed therewith. The various embodiments are configured to be readily and quickly assembled and disassembled, efficient, and are structured and arranged as disclosed to be suitably resistant to loosening in response to vibrational, shear and prevailing torque forces, even when exposed to or submerged in oil or other lubricant. The various embodiments disclosed herein are manufactured of standard materials routinely used in the manufacture of bolts and nuts and may be appropriately sized to relate to specific applications.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

The invention claimed is:

1. A fastener, comprising:
   a bolt including a shank having a first end, a second end, a first external thread proximate to the first end and including a major diameter, and an unthreaded body separating the first external thread from the second end and including a body diameter;
   an anchor nut including a first open end, a second open end, a head proximate to the first open end, a second external thread proximate to the second open end and including a minor diameter greater than the major diameter and the body diameter, a radial bearing surface between the head and the second external thread, a first dimension from the radial bearing surface to the second open end, and a first hole extending through the anchor nut from the first open end to the second open end, the first hole comprising a first internal thread extending from the first open end to a runout between the first open and the second open end, the first internal thread configured to thread on the first external thread, and the first hole unthreaded from the runout to the second open end and including an internal diameter greater than the major diameter and the body diameter;
   a locknut including a first side, a second side, a second dimension from the first side to the second side, and a second hole extending through the locknut from the first side to the second side, the second hole comprising a second internal thread configured to thread on the second external thread;
   the first external thread and the first internal thread twist in a first direction;
   the second external thread and the second internal thread twist in a second direction different from the first direction; and
   the first dimension less than the second dimension, wherein the locknut extends from the first side against the radial bearing surface to the second side outboard of the second open end when the second internal thread is threaded on the second external thread and the locknut is tightened, tightening the first side against the radial bearing surface.

2. The fastener according to claim 1, the bolt further comprising an enlarged head adjacent to the second end.

3. An anchor nut assembly, comprising:
   an anchor nut including a first open end, a second open end, a head proximate to the first open end, an external thread proximate to the second open end, a radial bearing surface between the head and the external thread, a first dimension from the radial bearing surface to the second open end, and a first hole extending through the anchor nut from the first open end to the second open end, the first hole comprising a first internal thread extending from the first open end to a runout between the first open and the second open end and being unthreaded from the runout to the second open end;
   a locknut including a first side, a second side, a second dimension from the first side to the second side, and a second hole extending through the locknut from the first side to the second side, the second hole comprising a second internal thread configured to thread on the external thread;
   the external thread and the first internal thread twist in different directions; and
   the second dimension less than the first dimension, wherein the locknut extends from the first side against the radial bearing surface to the second side outboard of the second open end when the second internal thread is threaded on the second external thread and the locknut is tightened, tightening the first side against the radial bearing surface.

4. A bolted joint, comprising:
   a bolt including a shank having a first end, a second end, an enlarged head adjacent to the second end, a first external thread proximate to the first end and including a major diameter, and an unthreaded body separating the first external thread from the second end and including a body diameter, the bolt extending through a first member and a second member, respectively, between the enlarged head against the first member and the first external thread extending outwardly from the second member;
   an anchor nut including a first open end, a second open end, a head proximate to the first open end, a second external thread proximate to the second open end and including a minor diameter greater than the major diameter and the body diameter, a radial bearing surface between the head and the second external thread, a first dimension from the radial bearing surface to the second open end, and a first hole extending through the anchor nut from the first open end to the second open end, the first hole comprising a first internal thread extending from the first open end to a runout between the first open and the second open end, the first internal thread threaded on the first external thread, and the first hole unthreaded from the runout to the second open end and including an internal diameter greater than the major diameter and the body diameter, the anchor nut extending outwardly to the first open end from the second open adjacent to the second member;
   a locknut including a first side, a second side, a second dimension from the first side to the second side, and a second hole extending through the locknut from the first side to the second side, the second hole comprising a second internal thread threaded on the second external thread, the locknut between the radial bearing surface and the second member and tightened, the locknut extending from the first end tightened against the radial bearing to the second end outboard of the second open end;
   the first external thread and the first internal thread twist in a first direction;
   the second external thread and the second internal thread twist in a second direction different from the first direction;

the first member and the second member clamped between the head against the first member and the second side of the locknut against the second member;

the locknut clamped between the radial bearing surface and the second member; and the first dimension less than the second dimension, disabling the second open end from contacting the second member.

\* \* \* \* \*